US011579232B1

(12) United States Patent
Duksta et al.

(10) Patent No.: US 11,579,232 B1
(45) Date of Patent: *Feb. 14, 2023

(54) ORGANIC NAVIGATIONAL BEACONS

(71) Applicant: Amazon Technologies, Inc., Seattle, WA (US)

(72) Inventors: John Clark Coonley Duksta, Seattle, WA (US); Camerin Cole Hahn, Redmond, WA (US); Fabian Thomas Hensel, Seattle, WA (US); Ronald Eugene Huebner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 205 days.

This patent is subject to a terminal disclaimer.

(21) Appl. No.: 16/922,888

(22) Filed: Jul. 7, 2020

Related U.S. Application Data

(63) Continuation of application No. 15/426,829, filed on Feb. 7, 2017, now Pat. No. 10,725,139.

(51) Int. Cl.
G01S 1/06 (2006.01)
G01S 1/02 (2010.01)
G08G 5/00 (2006.01)

(52) U.S. Cl.
CPC .............. *G01S 1/06* (2013.01); *G01S 1/024* (2013.01); *G08G 5/0004* (2013.01); *G08G 5/0069* (2013.01)

(58) Field of Classification Search
None
See application file for complete search history.

(56) References Cited

U.S. PATENT DOCUMENTS

| 5,596,332 A | 1/1997 | Coles et al. |
|---|---|---|
| 6,665,631 B2 | 12/2003 | Steinbrecher |
| 7,511,662 B2 * | 3/2009 | Mathews .............. G01S 5/0289 342/463 |
| 9,442,496 B1 | 9/2016 | Beckman et al. |
| 2009/0118875 A1 | 5/2009 | Stroud |
| 2010/0142448 A1 | 6/2010 | Schlicht et al. |
| 2016/0171896 A1 | 6/2016 | Buchmueller et al. |
| 2016/0247407 A1 | 8/2016 | Paczan et al. |
| 2016/0370263 A1 | 12/2016 | Duesterhoft et al. |
| 2017/0006417 A1 * | 1/2017 | Canoy ................ H04B 7/18506 |
| 2017/0031369 A1 | 2/2017 | Liu et al. |
| 2017/0176188 A1 | 6/2017 | Georgy et al. |
| 2017/0234966 A1 | 8/2017 | Naguib et al. |

(Continued)

Primary Examiner — Lail A Kleinman
(74) Attorney, Agent, or Firm — Athorus, PLLC

(57) ABSTRACT

Navigation beacons may be trained to receive signals of opportunity from one or more vehicles, to recognize their own position based on such signals, and to transmit information regarding their own position to one or more other vehicles accordingly. The navigation beacons may be of small size and feature a basic construction including one or more transceivers, power sources and the like, and may communicate via a Bluetooth® Low Energy, Ultra Wideband or long-range low-power wireless standard, or any other standard. The navigation beacons may be installed in any location, preferably being mounted to one or more existing fixed structures or facilities (e.g., transportation structures or facilities), and may operate in active and/or passive modes when learning their positions or servicing position information to one or more remote devices.

20 Claims, 15 Drawing Sheets

(56) References Cited

U.S. PATENT DOCUMENTS

2018/0074520 A1 3/2018 Liu et al.
2018/0173246 A1 6/2018 Crockett et al.
2019/0035288 A1 1/2019 Beltman et al.

* cited by examiner

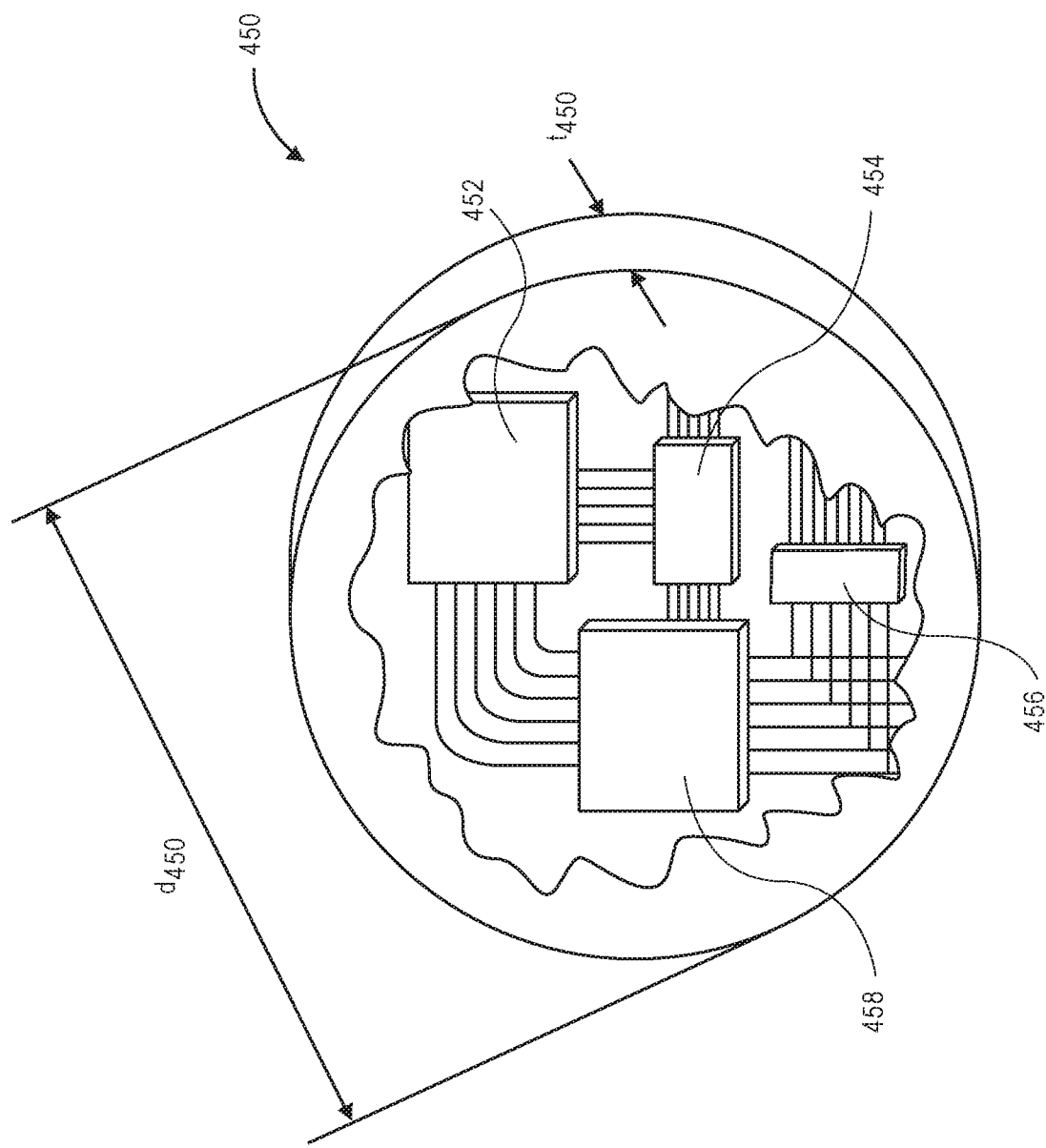

ORGANIC NAVIGATIONAL BEACONS

CROSS-REFERENCE TO RELATED APPLICATIONS

This application is a continuation of U.S. patent application Ser. No. 15/426,829, filed Feb. 7, 2017, now U.S. Pat. No. 10,725,139, the contents of which are incorporated by reference herein in their entirety.

BACKGROUND

Many modern vehicles (e.g., automobiles or aerial vehicles) or mobile computer devices, such as smartphones, tablet computers or other general or special purpose machines, include one or more components for determining information regarding positions, orientations, velocities or accelerations of such vehicles or devices, and for providing navigational advice or instructions based on such information. For example, some vehicles and computer devices include Global Positioning System (or "GPS") transceivers for determining positions using data received from one or more orbiting satellites, or cellular telephone equipment configured to estimate (e.g., triangulate) a position using signals received from one or more cellular telephone network towers or other network sources.

A GPS-enabled vehicle, device or other system or component may determine its position by interpreting signals that are received from multiple GPS satellites. A distance between a GPS receiver and a GPS satellite may be determined by calculating a "time of flight" between the GPS satellite and the GPS receiver for each such signal, which is assumed to travel at approximately the speed of light. Where three or more such signals are interpreted, the GPS receiver may be determined to be located at a specific point on the planet to within a certain degree of accuracy or tolerance, commonly on the order of two to ten meters.

Occasionally, position information determined using GPS satellites and GPS-enabled equipment may be inaccurate, irrelevant or unavailable. For example, like any computer device, most GPS-enabled equipment requires an initialization period during which GPS position information obtained or determined by such equipment is unreliable. Furthermore, where an environment includes many natural or artificial obstructions, such as tree limbs, office towers, mountains, walls or ceilings, the receipt of GPS signals by a GPS-enabled device may be delayed or otherwise interpreted as having arrived in an untimely manner. Moreover, the use of GPS satellites and GPS-enabled equipment necessarily relies on the viability of the GPS system as a whole. Like any computer-based system or communications system, the GPS system is at risk, at least theoretically, of hacking, spoofing or jamming, and may be taken offline or rendered unavailable for one or more legitimate or illegitimate purposes from time to time.

BRIEF DESCRIPTION OF THE DRAWINGS

FIG. 4 is a view of a navigation beacon in accordance with embodiments of the present disclosure.

DETAILED DESCRIPTION

As is set forth in greater detail below, the present disclosure is directed to navigation systems and methods incorporating one or more organic navigation beacons that may be trained to recognize their own positions based on one or more signals of opportunity received from one or more sources and configured to transmit position-based information to one or more vehicles, personnel or other objects that are configured to receive and interpret such information. In particular, the navigation beacons of the present disclosure may be substantially small, e.g., having one or more dimensions as small as approximately one inch (or a fraction of one inch). Moreover, the navigation beacons may be constructed in a low-cost manner and deployed and/or installed without being pre-programmed with their positions. Rather, the navigation beacons may be configured to learn their positions, and to provide, to one or more remote devices, information regarding their positions, or information regarding positions of the remote devices.

The navigation beacons of the present disclosure may have any size, shape or dimension and may include controllers, processors, transmitters and/or receivers, and power sources that are configured to transmit or receive signals at any intensity or frequency, or to operate for any duration. The navigation beacons may be deployed and installed in any manner, such as either manually or automatically, and in any regular or irregular (e.g., random) pattern. The navigation beacons may be configured to receive signals transmitted by any source, including airborne aerial vehicles, ground-based vehicles, or other transmitting devices (e.g., mobile computers), and trained to recognize their respective positions by any machine-based learning algorithms, methods or techniques. The navigation beacons may also be configured to report position data in the form of coordinates, altitudes and/or distances corresponding to their own respective positions or, alternatively, to calculate position data in the form of coordinates, altitudes and/or distances corresponding to positions of vehicles or other devices requesting such data. The position data may include one or more measures of the confidence or reliability in such data, e.g., a measure of the accuracy of a coordinate, an altitude and/or a distance provided to a remote device by the navigation beacon. Such measures may be provided in terms of a percent or a ratio or, alternatively, in terms of the coordinate, the altitude or the distance with which such measures are associated (e.g., degrees, minutes and/or seconds for a coordinate, or meters for an altitude or a distance).

Figure 1A:
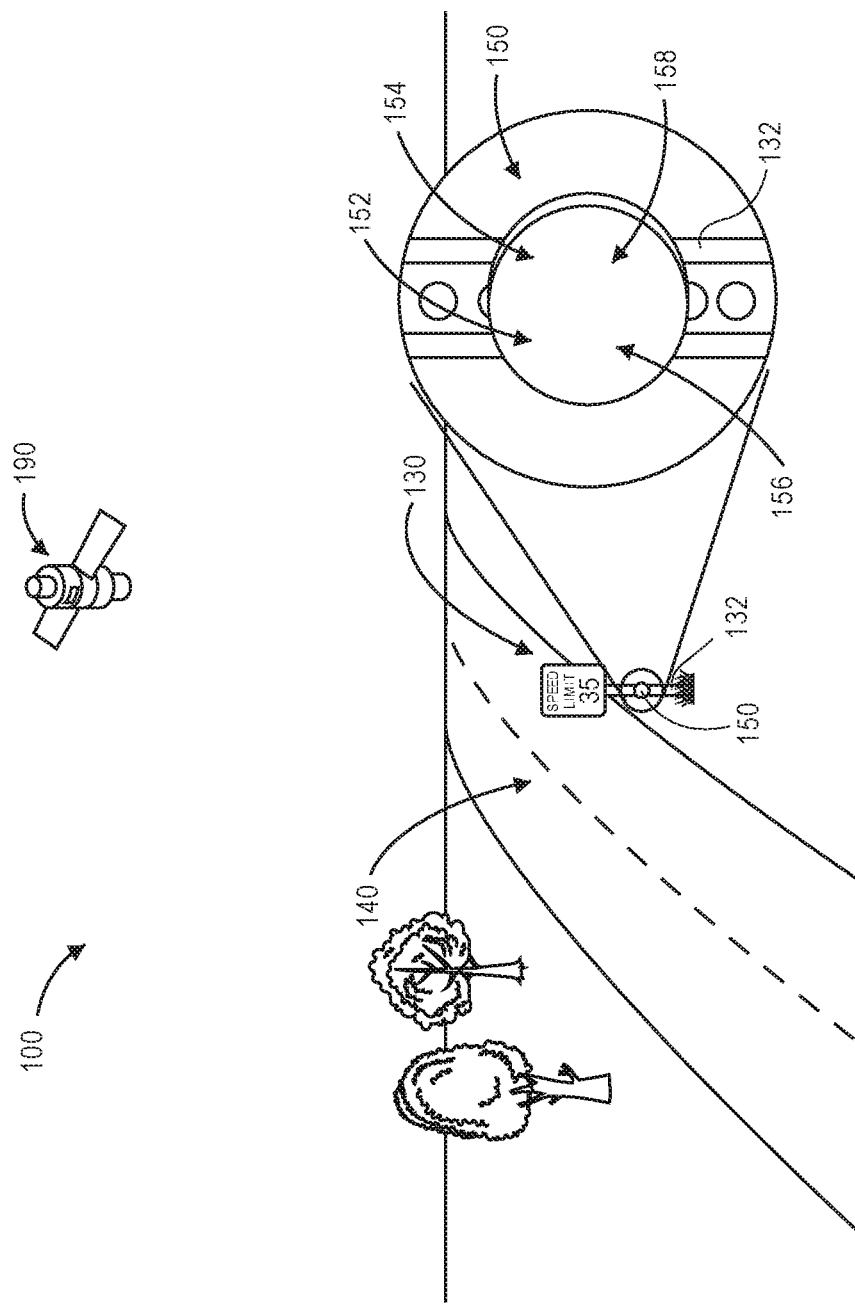
FIGS. 1A through 1D are views of aspects of one system including a navigation beacon in accordance with embodiments of the present disclosure.

Referring to FIGS. 1A through 1D are views of aspects of one system 100 including a navigation beacon 150 in accordance with embodiments of the present disclosure. As is shown in FIG. 1A, the system 100 includes a traffic sign 130 (or other ground-mounted indicator) mounted to a post 132 provided alongside a road 140 (or street, avenue, boulevard, highway, sidewalk, path or other ground-based infrastructure). A navigation beacon 150 is mounted to the post 132. The post 132 of FIG. 1A is a U-channel post formed from one or more steels or irons and having a plurality of evenly spaced and co-aligned holes with substantially identical diameters. Alternatively, in accordance with the present disclosure, the post 132 may be formed from any other suitable materials, including but not limited to one or more woods, plastics or composite materials, and may take any shape, form or size (e.g., round cross-sections, polygonal cross-sections or any other cross-section, and of any suitable length). The post 132 may be bare or covered with one or more external coatings, e.g., paint or powder coatings. The traffic sign 130 and the navigation beacon 150 may be mounted to the post 132, such as by using one or more bolts, nuts or other fasteners extending through one or more of the holes and/or around the post 132, or in any other manner.

The navigation beacon 150 includes a plurality of internal components that enable the navigation beacon 150 to communicate wirelessly with one or more external systems. For example, the navigation beacon 150 includes one or more processors 152, memory components 154, transceivers 156 (e.g., transmitters and/or receivers, which may be provided as a common unit, or as distinct components, within the navigation beacon 150) and power supplies 158. Additionally, the navigation beacon 150 is configured to communicate with one or more satellites of a GPS system 190, e.g., by way of the transceivers 156.

The processors 152 may be a uniprocessor system or a multiprocessor system capable of executing instructions for controlling the operation of the navigation beacon 150, e.g., the capture, processing and storage of signals of opportunity, or the generation of one or more signals thereby. The memory components 154 may include one or more static random access memory (SRAM), synchronous dynamic RAM (SDRAM), nonvolatile/Flash-type memory, or any other type of fixed or removable memory components. As is discussed above, the navigation beacon 150 may be mounted to the post 132 without first programming the memory components 154 with a position of the post 132 and/or a position of the navigation beacon 150.

The transceivers 156 may be configured to transmit and receive any type or form of signals according to any protocol or standard, e.g., via Bluetooth® Low Energy (or BLE), Ultra Wideband (or UWB), or a long-range, low-power wireless (or LoRa) protocol. For example, one or more of the transceivers 156 may be provided in a passive listening mode, and may receive signals including position information from one or more sources, such as one or more operating aerial vehicles, including coordinates and/or altitudes of such sources, or distances to such sources. One or more of the transceivers 156 may be provided in an active mode, e.g., transmitting signals comprising requests for position information, and may receive signals including position information in response to such requests. Alternatively, the transceivers may be provided in both a passive mode and an active mode. The transceivers 156 may also transmit, either actively or in response to one or more requests, signals including position information, such as coordinates and/or altitudes of the navigation beacon 150, distances to the navigation beacon 150, or coordinates and/or altitudes of one or more remote devices (e.g., an aerial vehicle) or distances from such devices that requested the position information from the navigation beacon 150. The power source 158 may be any type or form of battery (e.g., coin-cell batteries, button batteries, watch batteries, or any other batteries having any number of cells), fuel cell, solar panel and/or solar cell (e.g., with one or more supercapacitors) or other power source capable of generating sufficient current flows, at sufficient voltages, for desired durations, in order to power one or more of the processors 152, the memory components 154 and/or the transceivers 156.

Figure 1B:
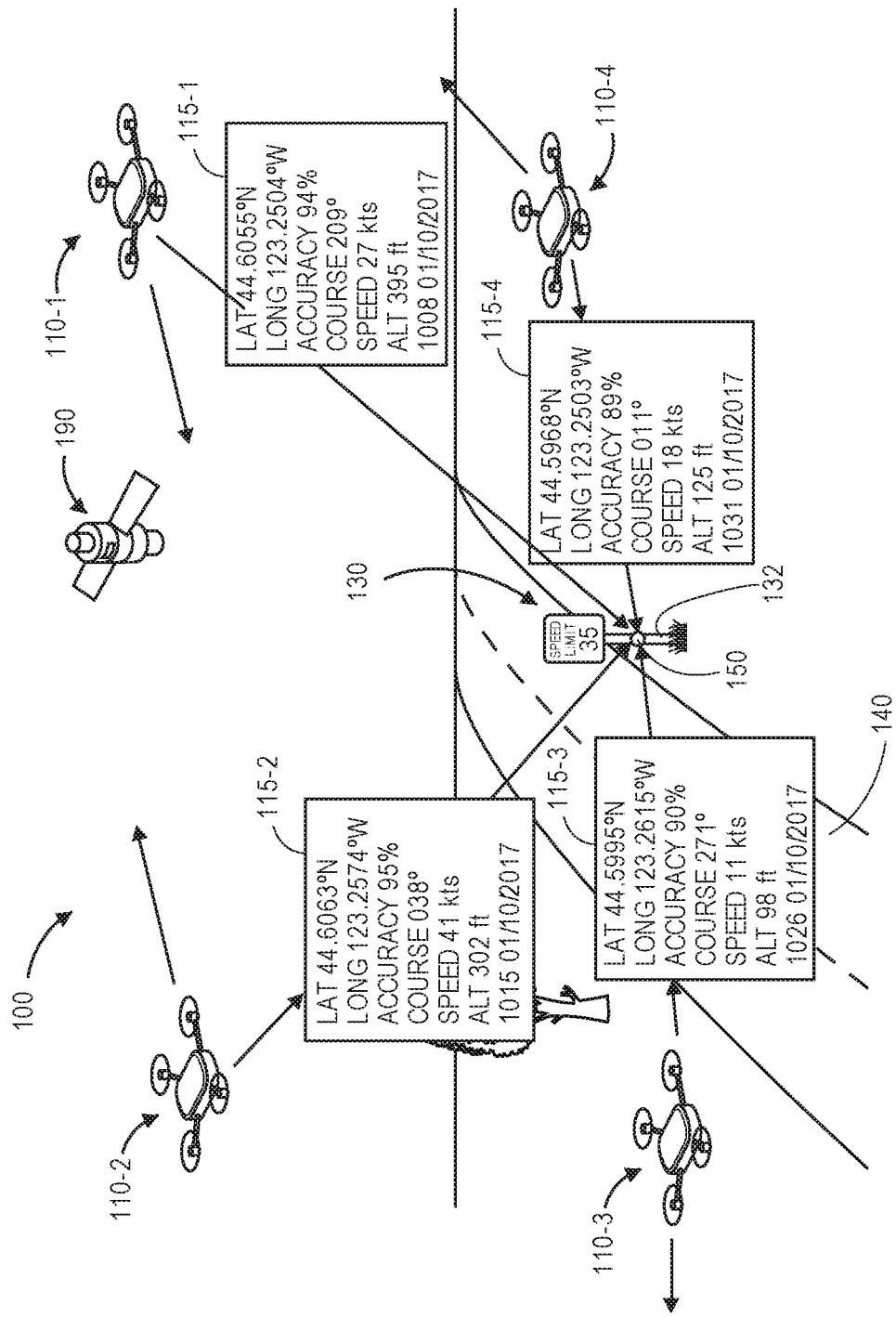

As is shown in FIG. 1B, the navigation beacon 150 is configured to receive one or more signals, e.g., position signals including one or more coordinates, altitudes and/or distances, along with one or more measures of confidence in such coordinates, altitudes or distances, from any number of sources in real time or in near-real time. Such signals may include information regarding positions of such sources, e.g., latitudes, longitudes and/or altitudes, or distances between the navigation beacon 150 to such sources, as well as courses and speeds of such sources. Additionally, bearings from which such signals are received from sources may be deduced upon their receipt and used to determine positions of such sources, e.g., in two-dimensional or three-dimensional space. Such signals may be time-stamped, e.g., marked or accompanied by an associated date and time. For example, as is shown in FIG. 1B, the navigation beacon 150 receives a position signal 115-1 including a position of an aerial vehicle 110-1 (e.g., a latitude of 44.6055° N, a longitude of 123.2504° W, and an altitude of 395 feet), as well as a course and a speed of the aerial vehicle 110-1 (e.g., 209 degrees and 27 knots), and a time and date associated with the position (e.g., 10:08 a.m. on Jan. 10, 2017). The position signal 115-1 further indicates that the position, course, speed and/or altitude are provided with approximately ninety-four percent (94%) accuracy. Similarly, the navigation beacon 150 also receives a position signal 115-2 indicating that an aerial vehicle 110-2 is located at a latitude of 44.6063° N, a longitude of 123.2574° W and an altitude of 302 feet, and traveling at a course of 038° and a speed of 41 knots, at 10:15 a.m. on January 10. The navigation beacon 150 further receives a position signal 115-3 indicating that an aerial vehicle 110-3 is located at a latitude of 44.5995° N, a longitude of 123.2615° W and an altitude of 98 feet, and traveling at a course of 271° and a speed of 11 knots, at 10:26 a.m. on January 10, and a position signal 115-4 indicating that an aerial vehicle 110-4 is located at a latitude of 44.5968° N, a longitude of 123.2503° W and an altitude of 125 feet, and traveling at a course of 011° and a speed of 18 knots, at 10:31 a.m. on January 10. The position signals 115-2, 115-3, 115-4 also indicate that such positions, courses, speeds and/or altitudes are provided with accuracies of approximately ninety-five percent (95%), ninety percent (90%) and eighty-nine percent (89%), respectively.

Figure 1C:
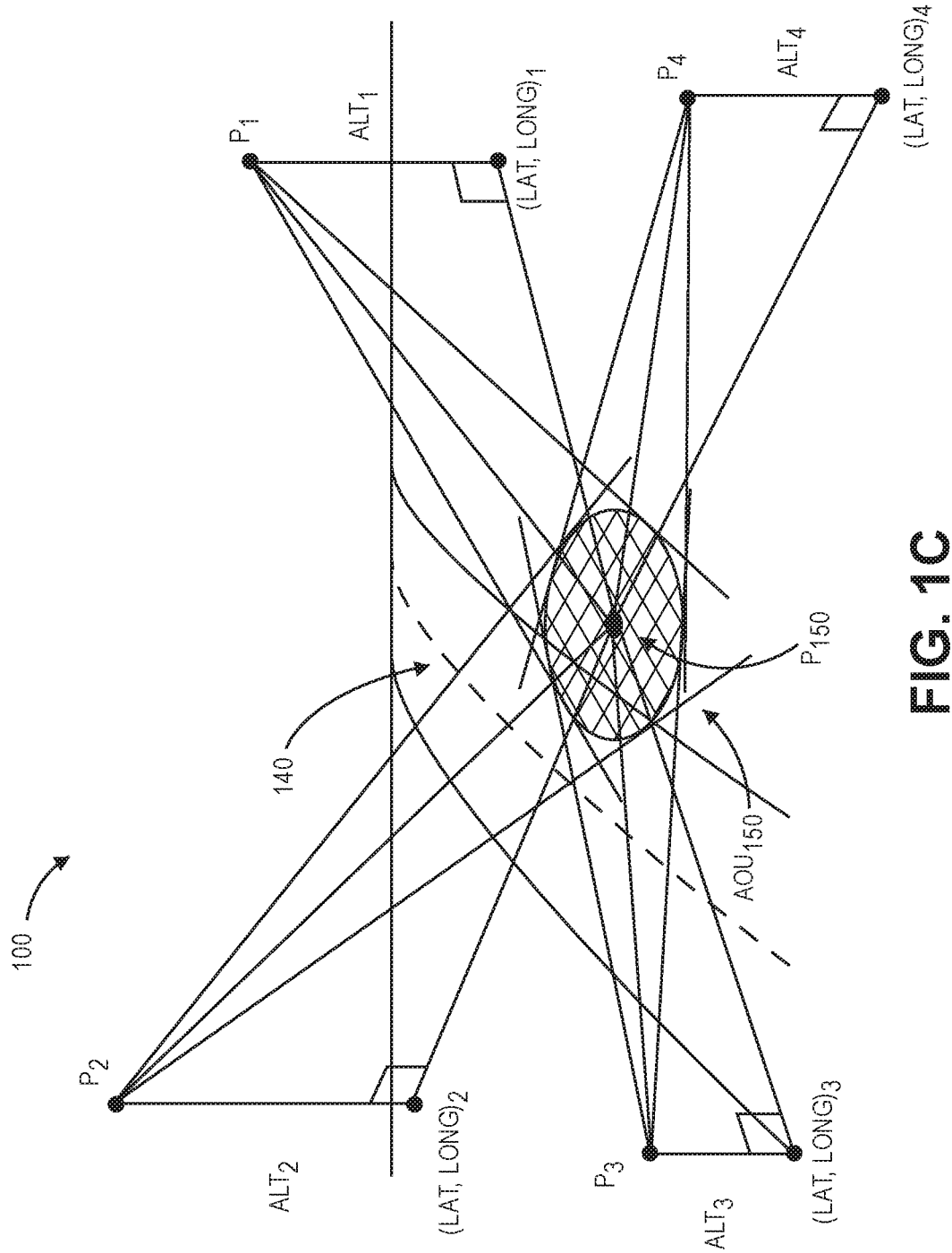

In accordance with the present disclosure, a navigational beacon need not be initially programmed with its own position, yet may be configured to recognize its own position based on one or more signals (e.g., signals of opportunity) that it receives from one or more sources. Assuming that the position of the navigation beacon is substantially fixed, the position of the navigation beacon may be determined by any number of techniques, including but not limited to determining intersections of lines of position from such sources, e.g., lines of position extending between the position of the navigation beacon and the positions of the sources reported within the signals of opportunity, or by determining the position of the navigation beacon by triangulation using one or more of the lines of position, or in any other manner. As is shown in FIG. 1C, the reported positions $P_1$, $P_2$, $P_3$, $P_4$ of the aerial vehicles 110-1, 110-2, 110-3, 110-4 are shown along with lines of position extending therefrom, along with errors or measures of uncertainty, to an area of uncertainty $AOU_{150}$ associated with the navigation beacon 150. The reported positions $P_1$, $P_2$, $P_3$, $P_4$ are defined based on coordinate pairs $(LAT, LONG)_1$, $(LAT, LONG)_2$, $(LAT, LONG)_3$, $(LAT, LONG)_4$ and respective altitudes $ALT_1$, $ALT_2$, $ALT_3$, $ALT_4$ indicated in the position signals 115-1, 115-2, 115-3, 115-4 received from the aerial vehicles 110-1, 110-2, 110-3, 110-4. The area of uncertainty $AOU_{150}$ may be defined based on the accuracy levels associated with the respective position signals 115-1, 115-2, 115-3, 115-4 or the various positions, courses, speeds and/or altitudes identified therein. Using the latitudes, longitudes and/or altitudes, as well as bearings from which the position signals 115-1, 115-2, 115-3, 115-4 are received, and any other available position information or data, the navigation beacon 150 may "learn" its position $P_{150}$.

Figure 1D:
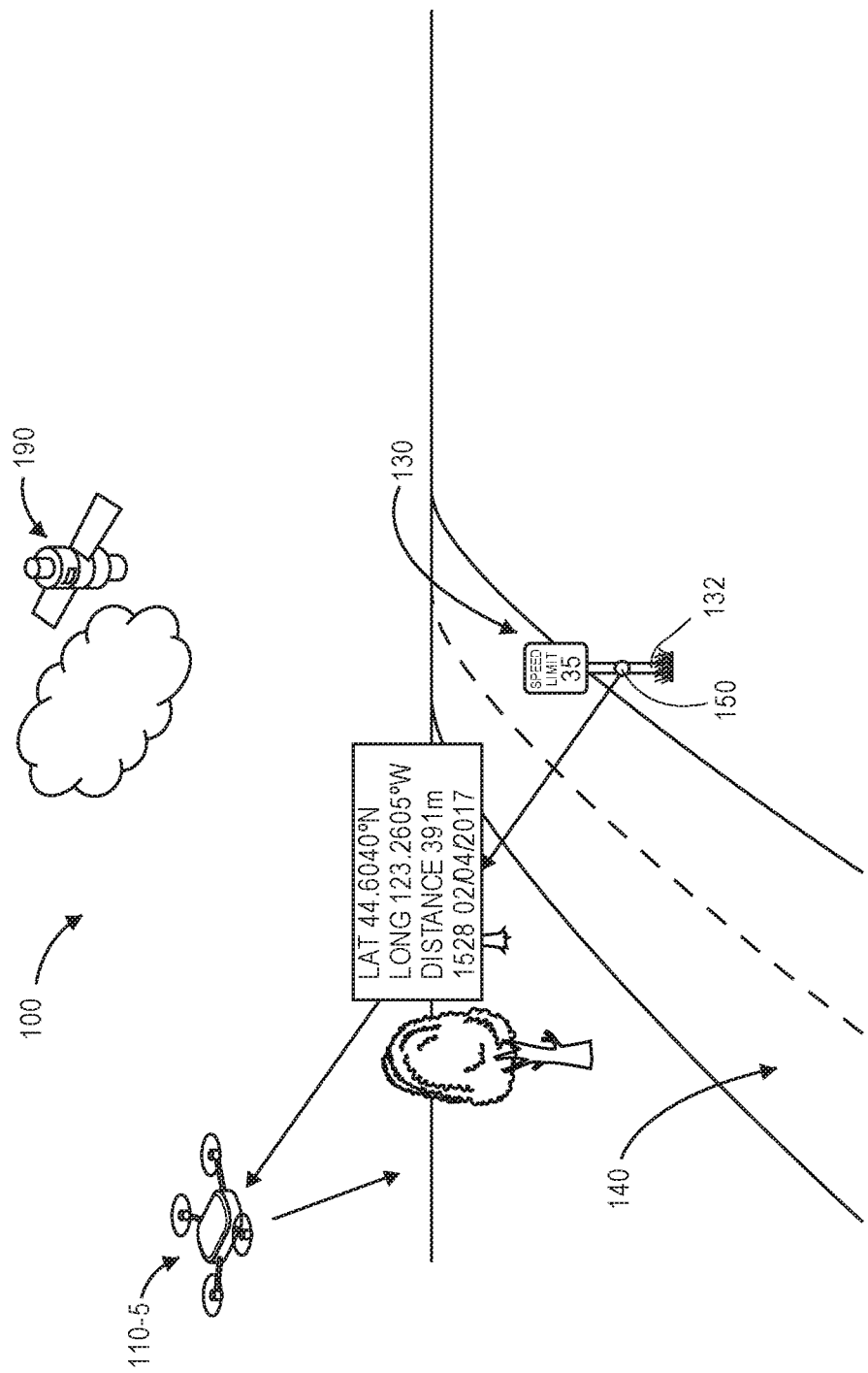

After a navigation beacon has learned its own position to a sufficiently high degree of confidence, e.g., based at least in part on one or more position signals, such as one or more of the position signals 115-1, 115-2, 115-3, 115-4, the navigation beacon may be programmed to transmit information or data regarding its position to one or more other remote devices, including vehicles (e.g., aerial vehicles) requesting such information or data. As is shown in FIG. 1D, an aerial vehicle 110-5 passing within a vicinity of the traffic sign 130 and/or the navigation beacon 150 mounted thereon, the navigation beacon 150 may be configured to transmit a position signal 115-5 to the aerial vehicle 110-5 that includes information regarding its position $P_{150}$ and a distance to the aerial vehicle 110-5 at a given time, e.g., a latitude of 44.6040° N and a longitude of 123.2605° W, and a distance of three hundred ninety-one meters (391 m) at 3:28 p.m. on Feb. 4, 2017. The aerial vehicle 110-5 may utilize the information included in the position signal 115-5 to determine its own position, e.g., that the aerial vehicle 110-5 is located somewhere at a distance or radius of three-hundred ninety-one meters from the position $P_{150}$. The position signal 115-5 may, alternatively, include information regarding a level of confidence or accuracy in the position $P_{150}$ or the distance or radius to the aerial vehicle 110-5. Alternatively, the navigation beacon 150 may calculate information regarding a position of the aerial vehicle 110-5, and the position signal 115-5 may include information regarding the position of the aerial vehicle 110-5.

Moreover, although FIG. 1D includes only a single position signal 115-5 being transmitted from the navigation beacon 150 to the aerial vehicle 110-5, one or more of such signals may be transmitted over a predetermined interval of time, while the aerial vehicle 110-5 is within the vicinity of the navigation beacon 150, or upon request from the aerial vehicle 110-5. Where the aerial vehicle 110-5 receives two or more of such signals from the navigation beacon 150 at different times, or from the navigation beacon 150 or another navigation beacon (not shown) at the same or similar times, the aerial vehicle 110-5 may pinpoint its location accordingly. For example, where a position signal includes a position of the navigation beacon 150 and a distance from the navigation beacon 150, the aerial vehicle 110-5 may be presumed to be located somewhere along a circumference (e.g., a circle) at the distance from the navigation beacon 150, and a more precise location of the aerial vehicle 110-5 may be determined based on additional information, e.g., a bearing from which the position signal was received, or information or data included in another position signal. Alternatively, the aerial vehicle 110-5 may receive a second position signal from another navigation beacon (not shown), in real time or in near-real time, and may pinpoint its position at an intersection of circles defined by distances from positions of such navigation beacons.

Moreover, position signals that are generated and transmitted by the navigation beacon 150 or by other navigation beacons (not shown) may be relied upon as a primary means for determining positions of remote devices that request such signals. Alternatively, such position signals may be relied upon as a secondary means for determining such positions, when one or more satellites of the GPS system 190 is obscured by clouds, such as is shown in FIG. 1D, or otherwise rendered unavailable for any reason and at any time. Furthermore, despite having learned its own position to a sufficiently high degree of confidence, the navigation beacon 150 may be configured to further update that position in a manner that increases the level of confidence or accuracy associated with the position, and enhances the reliability and/or quality of the position signals that are returned to one or more remote devices thereby.

Currently, some mobile computer devices, or vehicles or persons equipped with such devices (e.g., automobiles and/or aerial vehicles having one or more of such devices onboard, or pedestrians, cyclists or other individuals bearing a mobile device such as a smartphone or tablet computer), may determine their respective positions using various means or methods, such as a locating module that obtains a geocode or other data regarding a location of the mobile computer device at an associated level of accuracy or tolerance. Most commonly, such devices frequently include GPS sensors, microchips or other components that determine locations by interpreting signals from one or more GPS satellites. The GPS system comprises twenty-four satellites that circle the planet every twelve hours at an altitude of approximately eleven thousand nautical miles, and are maintained aloft by the United States Air Force. GPS-equipped computer devices typically operate by measuring the transit times of signals received from multiple satellites, which generally travel at the speed of light (viz., 186,000 miles per second, or $3.0 \times 10^8$ meters per second), and determining distances to the respective satellites based on the transit times. Using three or more such signals, an approximate position of a computer device may be determined to within a defined degree or level of accuracy. By some estimates, American GPS satellites may provide users with an accuracy level of approximately 7.8 meters (m), ninety-five percent of the time, anywhere around the planet.

Occasionally, however, some errors or inaccuracies may be encountered when determining positions using GPS systems. For example, propagation delays in the transmission of satellite signals may affect the speed of such signals through the ionosphere or troposphere. Additionally, any clocking delays may occasionally affect a determination of a distance between a device and a satellite, and a position of the device based on such a distance. Moreover, where GPS signals from one or more signals are blocked or impaired by vegetation or man-made structures, the accuracy of a position determined based on the interpretation of such signals may be called into question. Furthermore, in some applications, a position of a mobile computer device may be desired at a greater level of accuracy or precision than is currently available through the use of standard GPS systems and technology.

A "signal of opportunity" is commonly defined as a signal, of any type, kind or form, that is transmitted for non-navigation purposes, yet may be exploited for use in navigation functions. Traditionally, the term "signal of opportunity" has been understood to include, for example, amplitude modulated and/or frequency modulated (or AM/FM) radio signals, television signals, cellular telephone signals, or even wireless fidelity (or WiFi) signals, or any other wireless voice or data signals that are transmitted from towers, satellites and/or other transmitters in known and reliably determined positions.

Accordingly, navigation beacons may be deployed and installed in fixed positions and without being pre-programmed with their own positions (e.g., latitudes, longitudes and/or altitudes of such positions), but may be configured to recognize such positions based on signals of any type, kind or form that are received from any number of sources having known or determinable positions. The navigation beacons of the present disclosure may treat such signals as "signals of opportunity," and may include any computer processors or other computing components, memory components, transmitting and/or receiving components and power sources that enable such beacons to receive signals, and determine information or data regarding their respective positions and/or confidence in or reliability of the positions. Once such navigation beacons have determined their respective positions to a sufficiently high degree of confidence, the navigation beacons themselves may transmit position signals to one or more remote devices, e.g., computer devices or systems carried aboard vehicles (e.g., aerial vehicles, such as the aerial vehicle 110-5), mobile devices such as smartphones or tablet computers that are utilized by one or more persons, or any other similarly equipped devices. Signals transmitted by such beacons may include information or data regarding their respective positions, from which a remote device may determine its own position, or information or data regarding a position of the remote device, as well as a distance between a navigation beacon and a remote device, and measures or metrics associated with a level of confidence or accuracy of such information or data. In some embodiments, the remote device may determine its own position based on a single position signal received from a single navigation beacon. In some other embodiments, however, the remote device may determine its own position based on two or more position signals, e.g., two or more position signals received from a single navigation beacon, or two or more position signals received from multiple navigation beacons.

In some embodiments, the navigation beacons of the present disclosure may embody a substantially basic construction. For example, the navigation beacons may feature frames or other structures formed from lightweight, durable materials such as plastics, woods, metals, composites or other durable materials that provide sufficient structural support and protection against the elements for the components therein. For example, the frames or structures may be formed from one or more types of thermoplastics or thermosetting plastics such as epoxy or phenolic resins, polyurethanes or polyesters, as well as polyethylenes, polypropylenes or polyvinyl chlorides, or acrylonitrile butadiene styrenes. Alternatively, the frames or structures may be formed from one or more recycled plastics, bioplastics, cellulose or compostable plastics, natural plastics, or any other like materials. The components (e.g., processors, memory, transceivers and/or power sources) may be fixedly or releasably installed within such structures, which may formed in a single-piece construction or from multiple pieces, and closed or sealed therein using one or more fasteners, hinges, clips or like fasteners. Moreover, such structures may further include one or more holes, bores or other openings, or other structural features, which may aid in binding a navigation beacon to a substantially immovable fixture. In some implements, the navigation beacons may be joined to such structures using bolts, screws, rivets, nails or other like fasteners. In some other embodiments, navigation beacons may be joined to such structures using belts, straps, bands, clamps, clips or any other tension or compression members, as well as any number of glues, straps, or other adhesives (e.g., sufficiently durable tapes that may be backed with one or more natural or artificial liners, such as duct tape, as well as one or more hook-and-loop fasteners). In other embodiments, navigation beacons may be mounted to ground features, e.g., by stakes, nails, posts or other components. In still other embodiments, navigation beacons may be distributed in an environment, e.g., into an uninhabited field, where they may be presumed to remain in a constant location and/or undisturbed state.

Navigation beacons of the present disclosure may be configured to communicate (e.g., to transmit or receive signals) according to any communications protocol or standard. For example, the navigation beacons may be configured to receive any signal from any source that is located in a known or determinable position, and to recognize its own position by processing one or more of such signals. Signals of any type or form (e.g., signals of any intensity or transmitted at any frequency) may be captured by a navigation beacon and used to formulate a position therefrom. In some embodiments, such signals may be transmitted according to the Bluetooth® Low Energy (BLE, or Bluetooth® Smart) standard, in which signals are transmitted within a frequency spectrum of approximately 2.4000 to 2.4835 gigahertz (GHz), and in one of forty two-megahertz (2 MHz) channels. Bluetooth® BLE signals may be transmitted at ranges of over one hundred meters (100 m), and at data rates of up to approximately two megabits per second (2 Mbps), while consuming only a fraction of a watt of power. In some other embodiments, such signals may be transmitted according to the Ultra Wideband (UWB, or digital pulse wireless) standard. In such embodiments, one or more UWB signals may be transmitted within a frequency spectrum of approximately 3.1 to 10.6 gigahertz (GHz), with bandwidths of at least five hundred megahertz (500 MHz), or at least twenty percent of a center frequency. In still other embodiments, such signals may be transmitted according to a long-range, low-power (e.g., LoRa) standard. In such embodiments, one or more signals in a LoRa frequency spectrum, such as approximately nine hundred two to nine hundred twenty-eight megahertz (902-928 MHz) in the United States, or spectra of approximately eight hundred sixty-three to eight hundred seventy megahertz (863-870 MHz) in Europe, and approximately seven hundred seventy-nine to seven hundred eighty-seven megahertz (779-787 MHz) in China, may be transmitted and received accordingly.

In this regard, a navigation beacon may include any processors, chips (e.g., chipsets) or other components that are commonly associated with or required for communication according to a selected communications protocol or standard, or programmed as necessary (e.g., with one or more applications and/or sets of instructions) in order to communicate according to the selected protocol or standard. Such components may be joined to one or more boards or other components, e.g., a printed circuit board, that may be enclosed or encased within a frame or other structure of any shape, size or form. The disclosure of the systems and methods herein shall not be limited to communications according to any particular protocol or standard, frequency spectrum, frequency bandwidth or operating range, or any other communications parameter.

Moreover, navigation beacons of the present disclosure may be configured to communicate with (e.g., by the bidirectional sharing of any type or form of positioning information or data) any type of device that is within a sufficient operating range and configured to communicate according to the same communications protocol or standard. For example, one or more navigation beacons of the present disclosure may be configured to communicate with any number of automobiles, aircraft, smartphones, tablet computers, wristwatches, appliances or any other objects that are similarly configured. In some embodiments, a navigation beacon may be configured to receive communications signals from a vehicle or another device, and to determine its position based at least in part on such signals and the position of the vehicle or other device. In other embodiments, a navigation beacon may be configured to receive communication signals from antennas, towers or other transmitters associated with one or more AM/FM radio stations, television stations, cellular telephone systems or WiFi systems, and to determine its position based at least in part on such signals, and on positions of the antennas, towers or other transmitters. Moreover, a navigation beacon may also be configured to transmit communications signals including its position to any remote device, or communications signals including a position of a remote device to the remote device.

As used herein, the term "remote device" may refer to any computer device that may be configured to transmit and/or receive a position signal from a navigation beacon, or to request or offer a position signal to a navigation beacon, in accordance with the present disclosure. As used herein, the term "source" may refer to any source of communication signals that may be received by a navigation beacon and utilized as a signal of opportunity and from which a position of the navigation beacon may be determined. For example, the term "source" may include antennas, towers or other transmitters of signals, as well as a remote device that is so configured. Additionally, with respect to a particular navigation beacon, in some embodiments, the term "source" and the term "remote device" may also include another navigation beacon. For example, a first navigation beacon may transmit one or more signals regarding its position to a second navigation beacon. Such signals may include position information regarding one or more navigation beacons, requests for such information, or any other information or data.

Navigation beacons of the present disclosure may also be configured to operate in one or more modes. For example, a navigation beacon may operate in a learning mode (or a training mode, or a like mode), in which a primary function of the navigation beacon is to obtain information or data regarding its position, and to determine that position with a sufficiently high degree of confidence. Once the position of the navigation beacon has been determined accordingly, the navigation beacon may transition to a service mode (or a like mode), in which the navigation beacon provides one or more signals to any number of remote devices within its operating range. Such signals may relate to or include the position of the navigation beacon, or the position of a remote device. Additionally, a navigation beacon may operate in a passive mode (or a listening mode, or like mode), e.g., a mode in which the navigation beacon "listens" for signals transmitted by one or more sources. Such signals may include, but are not limited to, signals indicative of positions of such sources (e.g., when the navigation beacon is operating in a learning mode), or requests for signals transmitted by one or more remote devices (e.g., when the navigation beacon is operating in a service mode). Alternatively, a navigation beacon may operate in an active mode (or a like mode), or a mode in which the navigation beacon actively solicits position signals from any nearby sources, or actively transmits position signals or invitations to request such signals to any nearby remote devices. Moreover, a navigation beacon may continue to operate in a learning mode while also operating in an active mode, to thereby continue to refine and enhance the confidence or accuracy associated with its position based on position signals received from nearby sources even while providing position signals to any nearby remote devices.

Additionally, a navigation beacon may be configured to authenticate position signals that are received from one or more sources, or requests for position signals received from one or more remote devices. For example, a position signal that is transmitted or received by a navigation beacon according to the present disclosure, or a request for a position signal that is transmitted or received by a navigation beacon according to the present disclosure, may be subject to any authentication process or protective or cryptographic standard, and validated by any means. Moreover, where a navigation beacon is configured to learn, or is being trained to recognize, its own position based on signals received from one or more sources, the navigation beacon may be configured to accept and endorse signals that are received from authorized or trusted sources (e.g., an authorized vehicle, or a mobile device having an authorized component or operating an authorized application), or to reject or subject to further scrutiny signals that are received from unauthorized or untrusted sources, and may learn or train itself based only on signals that are received from authorized or trusted sources or have been confirmed to be authentic according to any such standard. Authority or trust in a signal may be established by association (e.g., signals received from sources such as vehicles that are associated with a given organization), by history (e.g., signals received from sources having demonstrated a track record of success in providing accurate and reliable position data), or in any manner or on any other basis. Furthermore, where a navigation beacon receives a position signal from a remote device, or provides a position signal to a remote device, the position signal may be accompanied by a measure of confidence or reliability of the position signal (e.g., a score, a percent, a degree, a distance), which may be calculated or selected on any basis or factor relating to confidence or reliability in a position (e.g., the latitude, the longitude and/or the altitude) of the navigation beacon and/or the remote device, or in a distance or radius between the navigation beacon and the remote device.

Figure 2:
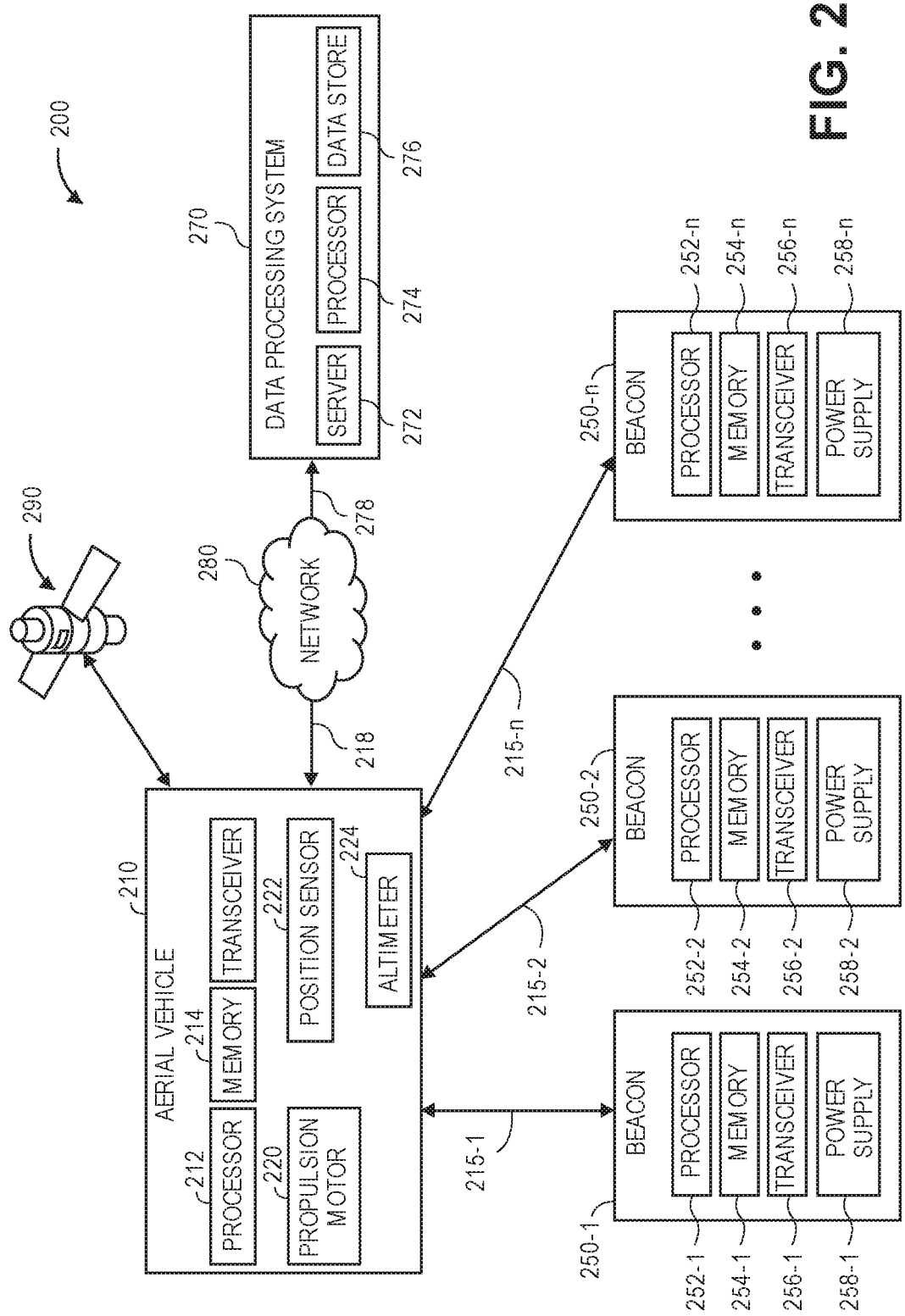
FIG. 2 is a block diagram of one system having one or more navigation beacons in accordance with embodiments of the present disclosure.

Referring to FIG. 2, a block diagram of components of one system 200 having one or more navigation beacons in accordance with embodiments of the present disclosure is shown. The system 200 of FIG. 2 includes an aerial vehicle 210 and a data processing system 270 connected to one another over a network 280, which may include the Internet, in whole or in part. The system 200 further includes a plurality of navigation beacons 250-1, 250-2 . . . 250-n, each of which may be in communication with the aerial vehicle 210, e.g., when the aerial vehicle 210 is within range of one or more of the navigation beacons 250-1, 250-2 . . . 250-n, or with one another. Except where otherwise noted, reference numerals preceded by the number "2" shown in FIG. 2 indicate components or features that are similar to components or features having reference numerals preceded by the number "1" shown in FIGS. 1A through 1D.

The aerial vehicle 210 includes a processor 212, a memory 214 and a transceiver 216, one or more propulsion motors 220, a position sensor 222 and an altimeter 224. The processor 212 may be configured to perform any type or form of computing function, including but not limited to the execution of one or more machine learning algorithms or techniques. For example, the processor 212 may control any aspects of the operation of the aerial vehicle 210 and the one or more computer-based components thereon, including but not limited to the propulsion motors 220, the position sensors 222 and/or the altimeter 224. The processor 212 may further control any aspects of the operation of any number of additional components that may be provided thereon, including but not limited to one or more fixed or movable (e.g., repositionable or reorientable) control surfaces such as wings, rudders, ailerons, elevators, flaps, brakes or slats, or other features; one or more sensors (e.g., digital cameras or other imaging devices, as well as radar sensors, laser sensors, or any other sensor that is configured to capture information or data in a specific direction or along a specific axis); one or more illuminators (e.g., fixed or addressable lights configured to project light of any color, frequency or wavelength, in any direction); and one or more engagement systems. Furthermore, the processor 212 may control the operation of one or more control systems or modules (not shown), e.g., for generating instructions for operating one or more of the propulsion motors 220, the position sensors 222, the altimeter 224 and/or one or more control surfaces, sensors, illuminators or engagement systems. Alternatively, the processor 212 may be a component part of one or more of such control systems.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor implementing any of a number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

The aerial vehicle 210 further includes one or more memory or storage components 214 (such as databases or data stores) for storing any type of information or data, e.g., instructions for operating the aerial vehicle 210, or information or data captured during operations of the aerial vehicle 210. Additionally, the memory 214 may be configured to store executable instructions, flight paths, flight control parameters and/or other data items accessible by or to the processor 212. The memory 214 may be implemented using any suitable memory technology, such as static random access memory (SRAM), synchronous dynamic RAM (SDRAM), nonvolatile/Flash-type memory, or any other type of memory. In some embodiments, program instructions, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "WiFi") protocol, such as over the network 280 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 280. For example, in some embodiments, the transceiver 216 may be configured to coordinate I/O traffic between the processor 212 and one or more onboard or external computer devices or components. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or incorporated directly into the processor 212.

In some embodiments, the transceiver 216 may transmit and/or receive signals according to the Bluetooth® Low Energy, e.g., within a frequency spectrum of approximately 2.4000 to 2.4835 gigahertz (GHz), and in two-megahertz (2 MHz) channels, or according to the Ultra Wideband standard, e.g., within a frequency spectrum of approximately 3.1 to 10.6 gigahertz (GHz), with bandwidths of at least five hundred megahertz (500 MHz), or at least twenty percent of a center frequency. The transceiver 216 may include any number of processors, chips (e.g., chipsets) or other components that are commonly associated with or required for communication according to a selected communications protocol or standard, or programmed as necessary (e.g., with one or more applications and/or sets of instructions) in order to communicate according to the selected protocol or standard. The signals transmitted and/or received by the transceiver 216 may be of any kind or type, and may be sent over the network 280, e.g., as is indicated by line 218, or directly to one or more of the navigation beacons 250-1, 250-2 . . . 250-n, e.g., as is indicated by the lines 215-1, 215-2 . . . 215-n.

The propulsion motors 220 may be any type or form of motor (e.g., electric, gasoline-powered or any other type of motor) capable of generating sufficient rotational speeds of one or more propellers or other components to provide lift and/or thrust forces to the aerial vehicle 210 and any engaged payload, and to aerially transport the engaged payload thereby. For example, one or more of the propulsion motors 220 may be a brushless direct current (DC) motor such as an outrunner brushless motor or an inrunner brushless motor. The aerial vehicle 210 may include any number of such propulsion motors 220 of any kind. For example, one or more of the motors 220 may be aligned or configured to provide forces of lift to the aerial vehicle 210, exclusively, while one or more of the propulsion motors 220 may be aligned or configured to provide forces of thrust to the aerial vehicle 210, exclusively. Alternatively, one or more of the propulsion motors 220 may be aligned or configured to provide forces of lift and forces of thrust to the aerial vehicle 210, as needed. For example, the propulsion motors 220 may be fixed in their orientation on the aerial vehicle 210, or configured to vary their respective orientations, e.g., a tilt-rotor aircraft. Moreover, the propulsion motors 220 may be aligned or configured to operate with different capacities or ratings, or at different speeds, or coupled to propellers having different sizes and shapes.

The position sensor 222 may be any type of sensor that is configured to determine a position of the aerial vehicle 210 in space, including but not limited to a GPS receiver that is configured to receive signals (e.g., trilateration data or information) relating to a position of the aerial vehicle 210 from one or more satellites of a GPS network 290, e.g., as is indicated by line 295. Alternatively, the position sensor 222 may be or include one or more accelerometers for detecting and/or measuring accelerations of the aerial vehicle 210 in one or more translational or rotational dimensions or directions. The position sensor 222 may be or include one or more compasses for determining one or more directions with respect to a frame of reference that is fixed with respect to the surface of the Earth (e.g., a pole). The position sensor 222 may also be or include one or more gyroscopes that are adapted to determine an angular orientation of the aerial vehicle 210, e.g., based on principles of angular momentum.

The altimeter 224 may be any type of sensor or meter for determining an altitude of the aerial vehicle 210. For example, the altimeter 224 may include any number of barometers, transmitters, receivers, range finders (e.g., laser and/or radar) or any other features. For example, the altimeter 224 may be or include a pressure altimeter, a sonic altimeter and/or a radar altimeter. An altitude of the aerial vehicle 210 may be determined using any type of sensor or system in accordance with the present disclosure. For example, an altitude of the aerial vehicle 210 may be determined by the position sensor 220, e.g., where the position sensor 220 is or comprises a GPS receiver.

The aerial vehicle 210 may also include any number of other sensors, components or other features (not shown) for controlling or aiding in the operation of the aerial vehicle 210, including but not limited to one or more imaging devices (e.g., digital cameras, depth sensors, range cameras, infrared cameras, radiographic cameras or other optical sensors), speedometers (e.g., anemometers), thermometers, barometers, hygrometers, air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), attitude indicators, depth gauges or sound sensors (e.g., microphones, piezoelectric sensors, vibration sensors or other transducers for detecting and recording acoustic energy from one or more directions). Such sensors may include any number of memory or storage components and processors, photosensitive surfaces, filters, chips, electrodes, clocks, boards, timers or any other relevant features (not shown).

Although the block diagram 200 of FIG. 2 includes a single box corresponding to the aerial vehicle 210, those of ordinary skill in the pertinent arts will recognize that the system 200 may include any number of aerial vehicles, each of which may include features that are identical to one another, or are customized in any manner. For example, each of the aerial vehicles in the system 200 may include one or more of the components of the aerial vehicle 210, e.g., the propulsion motor 220, the position sensor 222 and/or the altimeter 224, or any number of additional components and/or sensors (not shown).

The navigation beacons **250-1, 250-2 . . . 250-*n* may be configured to receive signals (e.g., signals of opportunity) from one or more sources, to determine positions thereof based on one or more of such signals, and to provide position information to one or more remote devices (e.g., the aerial vehicle 210 or any other remote devices), as well as to execute any algorithms, techniques and/or functions, perform any tasks or calculations, or take any other steps that may be required in order to receive such signals, to determine such positions or to provide such information in accordance with one or more of the embodiments disclosed herein. As is discussed above, each of the navigation beacons 250-1, 250-2 . . . 250-*n* may include one or more processors 252-1, 252-2 . . . 252-*n*, memory components 254-1, 254-2 . . . 254-*n*, transceivers 256-1, 256-2 . . . 256-*n* and power supplies 258-1, 258-2 . . . 258-*n*. Such components may be provided individually or in association with one or more discrete circuits, e.g., printed circuit boards (or PCBs) within a frame or structure of the navigation beacons 250-1, 250-2 . . . 250-*n***.

The processors **252-1, 252-2 . . . 252-*n* may share one or more of the attributes of the processor 212 discussed above. For example, the processors 252-1, 252-2 . . . 252-*n* may be configured to perform any type or form of computing function, including but not limited to the execution of one or more machine learning algorithms or techniques. For example, the processors 252-1, 252-2 . . . 252-*n* may control any aspects of the operation of the navigation beacons 250-1, 250-2 . . . 250-*n* and the one or more computer-based components thereon, e.g., the memory components 254-1, 254-2 . . . 254-*n*, the transceivers 256-1, 256-2 . . . 256-*n* and/or the power supplies 258-1, 258-2 . . . 258-*n*. The processors 252-1, 252-2 . . . 252-*n* may generate and/or execute one or more instructions associated with the receipt of signals from one or more other devices (e.g., the aerial vehicle 210), the determination of position information regarding a respective one of the navigation beacons 250-1, 250-2 . . . 250-*n* and/or such other devices, or the transmission of signals to one or more other devices. Each of the processors 252-1, 252-2 . . . 252-*n* may be a uniprocessor system including one processor, or a multiprocessor system including several processors (e.g., two, four, eight, or another suitable number), and may be capable of executing instructions. For example, in some embodiments, one or more of the processors 252-1, 252-2 . . . 252-*n* may be a general-purpose or embedded processor implementing any of a number of instruction set architectures (ISAs), such as the x86, PowerPC, SPARC, or MIPS ISAs, or any other suitable ISA. Where one or more of the processors 252-1, 252-2 . . . 252-*n*** is a multiprocessor system, each of the processors within the multiprocessor system may operate the same ISA, or different ISAs.

The memory components **254-1, 254-2 . . . 254-*n* may be any fixed or virtual medium (such as databases or data stores) that is configured for storing any type of information or data, e.g., information or data regarding signals received from one or more sources (e.g., the aerial vehicle 210), or positions of one or more of the navigation beacons 250-1, 250-2 . . . 250-*n* or any such sources or remote devices (e.g., the aerial vehicle 210). Additionally, the memory 214 may be configured to store executable instructions, flight paths, flight control parameters and/or other data items accessible by or to the processors 252-1, 252-2 . . . 252-*n*. The memory components 254-1, 254-2 . . . 254-*n*** may be implemented using any suitable memory technology, such as static random access memory (SRAM), synchronous dynamic RAM (SDRAM), nonvolatile/Flash-type memory, or any other type of memory.

The transceivers **256-1, 256-2 . . . 256-*n*** may be configured to transmit and/or receive any type or kind of signal, to or from any number of sources or remote devices, e.g., the aerial vehicle 210, according to any protocol or standard. The transceivers 256-1, 256-2 . . . 256-n may share one or more properties and/or execute one or more of the functions of the transceiver 216, described above, and may be configured to act in a manner reciprocal to that of the aerial vehicle 210 and/or the transceiver 216, i.e., to receive signals sent by the transceiver 216 or to send signals to the transceiver 216, or to act in a manner identical to that of the aerial vehicle 210 and/or the transceiver 216. For example, one or more of the transceivers 256-1, 256-2 . . . 256-n of the navigation beacons 250-1, 250-2 . . . 250-n may act as sources and/or remote devices to or on behalf of one or more other transceivers 256-1, 256-2 . . . 256-n of the navigation beacons 250-1, 250-2 . . . 250-n. In some embodiments, one or more of the navigation beacons 250-1, 250-2 . . . 250-n may include multiple transceivers 256-1, 256-2 . . . 256-n. For example, one of the navigation beacons 250-1, 250-2 . . . 250-n may include transceivers dedicated to communication according to specific standards, e.g., a first transceiver dedicated to communication according to the Bluetooth® BLE standard, a second transceiver dedicated communication according to the UWB standard, a third transceiver dedicated to communication according to the LoRa standard, or any number of other transceivers dedicated to communication according to any other standard. Likewise, one or more of the navigation beacons 250-1, 250-2 . . . 250-n may include transceivers 256-1, 256-2 . . . 256-n that are specifically dedicated to receiving position signals or requests, and also transceivers 256-1, 256-2 . . . 256-n that are specifically dedicated to transmitting position signals or responding to such requests. Moreover, one or more of the navigation beacons 250-1, 250-2 . . . 250-n may include primary and secondary (e.g., backup) transceivers 256-1, 256-2 . . . 256-n, redundant transceivers 256-1, 256-2 . . . 256-n, or transceivers that may communicate for any purpose or at any time.

The power supplies 258-1, 258-2 . . . 258-n may be or include any type of power source for providing electrical power or other forms of power in support of one or more loads of the navigation beacons 250-1, 250-2 . . . 250-n. In some embodiments, the power supplies 258-1, 258-2 . . . 258-n may include one or more batteries or other power cells, e.g., dry cell or wet cell batteries such as lead-acid batteries, lithium ion batteries, nickel cadmium batteries or nickel metal hydride batteries, or any other type, size or form of batteries. In particular, in some embodiments, the power supplies may be batteries such as coin-cell batteries, button batteries, watch batteries, or any other batteries having any number of cells that are sufficiently small and have initial voltages of approximately one-and-one-half to three-and-one-half volts (1.5-3.5 V). The power supplies 258-1, 258-2 . . . 258-n may each have any cell voltages, peak load currents, charge times, specific energies, internal resistances or cycle lives, or other power ratings. The power supplies 258-1, 258-2 . . . 258-n may also be any type, size or form of other power source, e.g., other than a battery, including but not limited to or more fuel cells, solar panels and/or solar cells (e.g., having any number of supercapacitors), or the like.

The various aspects of the navigation beacons 250-1, 250-2 . . . 250-n may be provided in one or more common components, controllers and/or circuits. For example, for a given one of the navigation beacons 250-1, 250-2 . . . 250-n, each of the processors 252-1, 252-2 . . . 252-n, the memory components 254-1, 254-2 . . . 254-n, the transceivers 256-1, 256-2 . . . 256-n and/or the power supplies 258-1, 258-2 . . . 258-n may be provided in a single card, circuit board (e.g., a printed circuit board, or PCB), chip or chipset, or any other single component. Alternatively, one or more of such components may be provided as discrete components within a common frame of a corresponding one of the navigation beacons 250-1, 250-2 . . . 250-n.

Although the block diagram 200 of FIG. 2 includes three boxes corresponding to the navigation beacons 250-1, 250-2 . . . 250-n, those of ordinary skill in the pertinent arts will recognize that the system 200 may include any number n of navigation beacons, each of which may include features that are identical to one another, or are customized in any manner. For example, each of the navigation beacons in the system 200 may include one or more of the components of the navigation beacons 250-1, 250-2 . . . 250-n, e.g., the processors 252-1, 252-2 . . . 252-n, the memory components 254-1, 254-2 . . . 254-n, the transceivers 256-1, 256-2 . . . 256-n and/or the power supplies 258-1, 258-2 . . . 258-n, or any number of additional components (not shown).

Additionally, the system 200 may include any number of other sources and/or remote devices (not shown) that perform one or more of the functions or tasks described above with regard to the aerial vehicle 210 and/or one or more of the navigation beacons 250-1, 250-2 . . . 250-n. As is discussed above, the functions or tasks described above with regard to the aerial vehicle 210 may also be performed by any type of other vehicle (e.g., a manned or unmanned automobile or other vehicle), or by any other type of computing device, e.g., a mobile device such as a smartphone and/or tablet computer. Such other devices may include any number of the components described above with regard to the aerial vehicle 210 and/or the navigation beacons 250-1, 250-2 . . . 250-n, in the same configuration or in different configurations. Additionally, any number of such other devices may act as sources and/or remote devices for one or more of the navigation beacons 250-1, 250-2 . . . 250-n in the manner described above.

The data processing system 270 includes one or more physical computer servers 272 and/or processors 274 having a plurality of data stores 276 associated therewith, and the servers 272, the processors 274 and/or the data stores 276 provided for any specific or general purpose. For example, the data processing system 270 of FIG. 2 may be independently provided for the exclusive purpose of receiving, analyzing or storing information or data received from the aerial vehicle 210 one or more of the navigation beacons 250-1, 250-2 . . . 250-n, or, alternatively, provided in connection with one or more physical or virtual services. The servers 272 may be connected to or otherwise communicate with the processors 274 and/or the data stores 276. The data stores 276 may store any type of information or data, including but not limited to acoustic signals, information or data relating to imaging data, or information or data regarding environmental conditions, operational characteristics, or positions, for any purpose. The servers 272 and/or the computer processors 274 may also connect to or otherwise communicate with the network 280, as indicated by line 278, through the sending and receiving of digital data. For example, the data processing system 270 may include any facilities, stations or locations having the ability or capacity to receive and store information or data, such as signals and/or position information or data, in one or more data stores, or from one or more other external computer systems (not shown) via the network 280. In some embodiments, the data processing system 270 may be provided in a physical location. In other such embodiments, the data processing system 270 may be provided in one or more alternate or virtual locations, e.g., in a "cloud"-based environment. In still other embodiments, the data processing system 270 may be provided onboard one or more aerial vehicles, including but not limited to the aerial vehicle 210.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some embodiments, the network 280 may be a private or semi-private network, such as a corporate or university intranet. The network 280 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein. In some embodiments, the network 280 may include one or more routers or transmitters that are configured to generate one or more signals that act as signals of opportunity for one or more of the navigation beacons 250-1, 250-2 . . . 250-n.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210 and/or the data processing system 270 may use any web-enabled or Internet applications or features, or any other client-server applications or features including E-mail or other messaging techniques, to connect to the network 280, or to communicate with one another, such as through short or multimedia messaging service (SMS or MMS) text messages. For example, the aerial vehicle 210 may be adapted to transmit information or data in the form of synchronous or asynchronous messages to the data processing system 270 or to any other computer device (e.g., to one or more other aerial vehicles) in real time or in near-real time, or in one or more offline processes, via the network 280. Those of ordinary skill in the pertinent art would recognize that the aerial vehicle 210 or the data processing system 270 may operate or be operated by any of a number of computing devices that are capable of communicating over the network 280. Protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 212 or the processor 274, or any other computers or control systems utilized by the aerial vehicle 210 or the data processing system 270 (e.g., by one or more other aerial vehicles), and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

The present disclosure references a number of computer-based functions or tasks that may be executed by one or more computer processors, systems or resources. In some implementations, each of such functions or tasks may be executed by processors associated with an aerial vehicle, e.g., the processor 212, or a navigation beacon, e.g., the processors 252-1, 252-2 . . . 252-n, and one or more of the aerial vehicle 210 and/or the navigation beacons 250-1, 250-2 . . . 250-n may independently act upon instructions generated by such processors upon executing such functions or tasks. In some other implementations, each of such functions or tasks may be executed by processors that are external to an aerial vehicle or a navigation beacon, e.g., the processor 274, such as in one or more other physical, alternate or virtual locations, e.g., in a "cloud"-based environment. In still other implementations, such functions or tasks may be executed in a distributed manner, such as by computer processors, systems or resources in two or more distributed locations. For example, some of such functions or tasks may be executed by processors associated with one or more aerial vehicles or navigation beacons, while other functions or tasks may be executed by processors located in one or more other physical, alternate or virtual locations.

Figure 3:
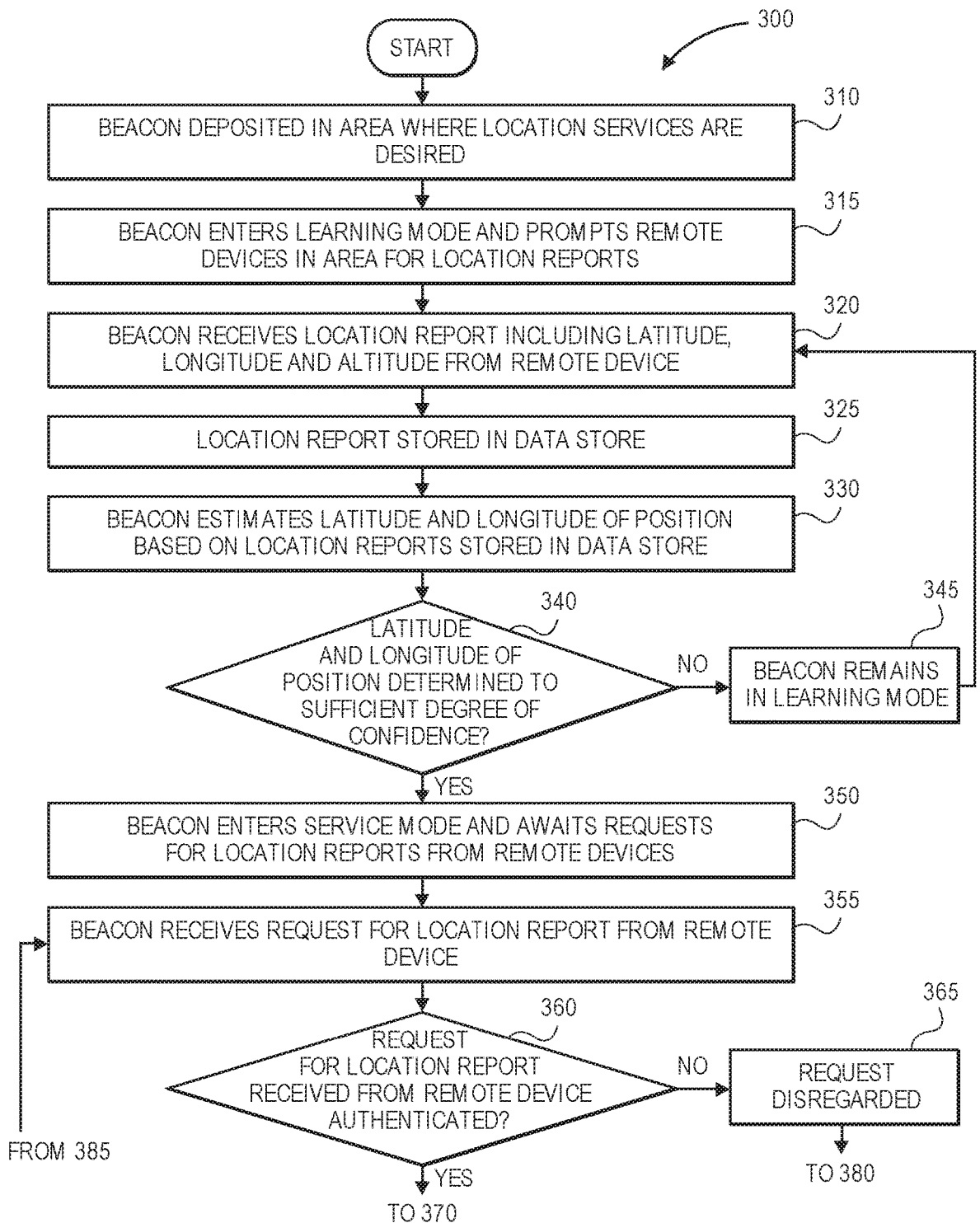
FIG. 3 is a flow chart of one process for navigating using one or more navigation beacons in accordance with embodiments of the present disclosure.
Figure 3:
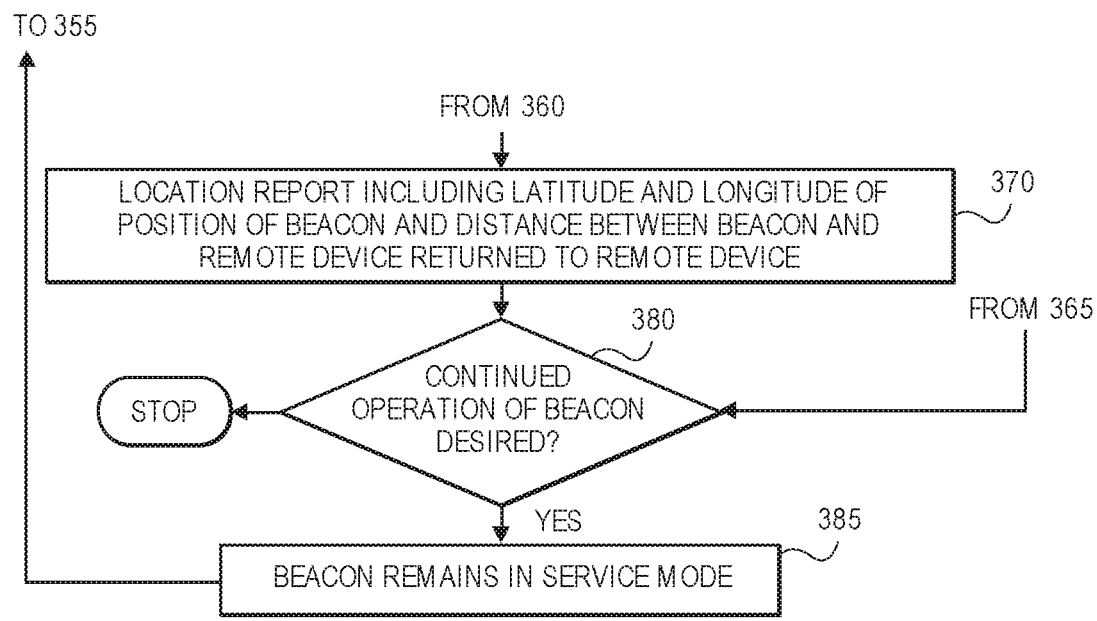

As is discussed above, a navigation beacon may be trained to recognize its own position based on signals of opportunity received from one or more sources, including but not limited to one or more transmitters (e.g., transceivers) associated with a vehicle (e.g., an aerial vehicle, an automobile, or any other type or form of vehicle), a mobile device, another navigation beacon, or any other source. Referring to FIG. 3, a flow chart 300 of one process for navigating using one or more navigation beacons in accordance with embodiments of the present disclosure is shown. At box 310, a beacon is deposited in an area where location services are desired. For example, the area may be one in which traditional location services (e.g., GPS services) are unavailable or spotty, e.g., areas with typically thick cloud cover or other obstructions, areas within tunnels or under coverings, or areas with high interference patterns or high levels of demand for such location services. Alternatively, where the location services are desired as a secondary source, the area may be selected with redundancy in mind, or based on a likelihood that the location services will fail or be rendered unavailable. Additionally, the manually or automatically installed or placed at the area, e.g., by one or more workers or machines. The beacon may be of any shape or size, and may include one or more processors, memory components, transceivers and/or power sources, as is discussed above.

At box 315, the beacon enters a learning mode and prompts one or more remote devices within the area for location reports. For example, the beacon may actively transmit general signals polling any remote devices (e.g., computer devices associated with one or more vehicles, persons or the like) to provide signals including coordinates, altitudes and/or distances corresponding to their respective positions. Where the beacon determines that an aerial vehicle is within range, the beacon may prompt the aerial vehicle specifically by one or more such signals. Alternatively, the beacon may operate in a passive mode, and may effectively listen for one or more position signals transmitted by sources in the area, e.g., one or more vehicles, such as the aerial vehicles 110-1, 110-2, 110-3, 110-4 of FIGS. 1A through 1D.

At box 320, the beacon receives a location report from a remote device within the area. The location report is presented in one or more signals, e.g., one or more of the signals 115-1, 115-2, 115-3, 115-4 of FIG. 1B, and includes at least a latitude, a longitude and an altitude of the remote device. Alternatively, the signals may include a date or a time associated with the location report, or any other relevant information or data associated with the location report or the remote device from which the location report was received. For example, in some embodiments, the location report may be sent in one or more signals within a two-megahertz Bluetooth® BLE channel, or in one or more UWB or LoRa signals. In some embodiments, the beacon may be configured to authenticate the location report, or to otherwise verify the remote device from which the location report was received. At box 325, the location report is stored in a data store residing on the beacon, e.g., with any number of location reports previously received from one or more sources. The contents of the location report may be recorded with any additional information or data, including but not limited to a bearing to the remote device from which the location report was received.

At box 330, the beacon estimates a latitude and a longitude of the position of the beacon based on the one or more location reports stored in the data store. For example, assuming that the beacon is substantially fixed in its position, the position of the beacon may be estimated in any manner, such as by determining intersections of lines of position from such sources, e.g., lines of position extending between the position of the navigation beacon and the positions of the sources reported within the signals of opportunity, or by determining the position of the navigation beacon by triangulation using one or more of the lines of position, or in any other manner. As is shown in FIG. 1C, the position $P_{150}$ may be estimated by triangulation of one or more signals 115-1, 115-2, 115-3, 115-4 containing the location reports that were previously received, or based on an intersection of two or more of the signals 115-1, 115-2, 115-3, 115-4.

At box 340, whether the latitude and the longitude of the position of the beacon determined at box 330 are within a sufficient degree of confidence is determined. The degree of confidence may be determined in any manner and may be based on any information or data regarding the remote device, the beacon and/or the area in which the beacon is deposited. For example, in some embodiments, coordinates and/or altitudes of a position of the beacon, or distances from the position of the beacon to one or more sources or remote devices, may be defined based at least in part on geolocation estimation techniques which determine probability distributions, e.g., according to a Gaussian location hypothesis or other methods or techniques for modeling errors or uncertainty, of the signals and/or location reports, and any levels of uncertainty associated with such distributions, and group the intersections of such signals into one or more hypothetical location clusters, e.g., location hypotheses or areas of uncertainty. Moreover, the degree of confidence may be determined as a score, a percent or a coordinate, or as any other measure or according to any other standard. When a position of the beacon is determined, the position and any associated information, data or metadata regarding sensor noise or a level of uncertainty of the position may be represented in a vector or other set of variables defining a probability distribution that includes coordinates of the position and any uncertainties associated with the remote device and/or the sensor, such as a standard deviation. The position may be modeled according to any methods or techniques for indicating errors or uncertainties, including but not limited to a Gaussian distribution.

If the position of the beacon is not determined to a sufficient degree of confidence, then the process advances to box 345, where the beacon remains in the learning mode, before returning to box 320, where the beacon receives another location report from another remote device (or, alternatively, the same remote device from which a location report was previously received), and to box 325, where the location report is stored in the data store on the beacon.

If the position of the beacon is determined to a sufficient degree of confidence, however, then the process advances to box 350, where the beacon transitions to a service mode, e.g., a mode in which the beacon provides location-based information, and awaits requests for location reports from one or more remote devices. Alternatively, the beacon may actively solicit such reports, e.g., by transmitting one or more signals to any number of remote devices within the area. Alternatively, the beacon may, while operating in a service mode, continue to operate in a learning mode, and may refine its position (e.g., by increasing the degree of confidence associated with the position) based on location reports received from nearby remote devices even while providing location reports to other nearby remote devices.

At box 355, the beacon receives a request for a location report from a remote device. At box 360, the request for the location report is authenticated. For example, in some embodiments, the beacon may be configured to accept requests for location reports, or location reports, that are electronically signed, or include a virtual access key, or are otherwise identifiable based on their respective content. Any type of signal and/or message transmitted or received by a beacon, a source and/or a remote device may be authenticated in any manner in accordance with the present disclosure. Alternatively, in some embodiments, the beacon may be configured to accept any requests for location reports, or location reports, from any source, regardless of whether the source has been authenticated or verified.

If the request is authenticated, the process advances to box 370, where a location report including a latitude and a longitude of the position of the beacon, and a distance (or radius) between the remote device and the beacon, is returned to the remote device, which may then determine its own position based at least in part on the position of the beacon. For example, the remote device may determine its position based on the position of the beacon as well as the distance between the beacon and the remote device, and additional information such as a bearing from which the location report was received.

Alternatively, however, the beacon may determine a position of the remote device based on its own position, on the distance between the remote device and the beacon, on the bearing from which the request was received at box 360, and may return to the remote device a report that includes the position of the remote device. In some embodiments, the remote device (e.g., an aerial vehicle) may evaluate the location report that was received from the beacon and determine whether the report is reliable or sufficient for its purposes.

At box 380, after the location report has been returned to the remote device, or if the request has been disregarded, whether the continued operation of the beacon is desired may be determined. If the continued operation of the beacon (e.g., use of the beacon for location services) is not desired, then the process ends. If the continued operation of the beacon is desired, however, then the process advances to box 385, where the beacon remains in the service mode, before returning to box 355, where the beacon receives another request for a location report from a remote device.

As is discussed above, the navigation beacons of the present disclosure may take any shape or form, and may include any number of components for receiving, processing and storing signals including information or data regarding one or more positions, and for transmitting one or more signals including information or data regarding one or more positions, as well as for authenticating requests for position signals, evaluating accuracy and/or confidence levels associated with positions (e.g., coordinates, altitudes and/or distances) or performing any of the functions disclosed herein. Referring to FIG. 4, a view of one navigation beacon 450 in accordance with embodiments of the present disclosure is shown. Except where otherwise noted, reference numerals preceded by the number "4" shown in FIG. 4 indicate components or features that are similar to components or features having reference numerals preceded by the number "2" shown in FIG. 2 or by the number "1" shown in FIGS. 1A through 1D.

As is shown in FIG. 4, the navigation beacon 450 is a round, substantially disc-shaped object having a diameter $d_{450}$ and a thickness $t_{450}$. The navigation beacon 450 defines a cavity having a plurality of components and/or circuitry disposed therein, including one or more processors 452, memory components 454, transceivers 456 and power sources 458, which may be provided in discrete components or circuits, or joined together as one or more independent components or circuits. Such components may be multi-purpose in nature, or may be dedicated to performing one or more discrete functions. For example, the navigation beacon 450 may be equipped with two or more processors 452, two or more memory components 454, two or more transceivers 456 and two or more power sources 458, each of which may be fixedly or releasably installed within a cavity defined by the navigation beacon 450. Moreover, such components may be formed in a single-piece construction or from multiple pieces, and the navigation beacon 450 may be closed or sealed with such components therein using one or more fasteners, hinges, clips or like fasteners.

In some embodiments, the navigation beacon 450 may be formed from one or more plastics of any density or rigidity, including but not limited to thermoplastics or thermosetting plastics such as epoxy or phenolic resins, polyurethanes or polyesters, as well as polyethylenes, polypropylenes or polyvinyl chlorides, or acrylonitrile butadiene styrenes. In some embodiments, the navigation beacon 450 may be permanently or temporarily closed with the processors 452, memory components 454, transceivers 456 and power sources 458 therein, such as by one or more lips, rims (e.g., a snap-fit construction), glues, sealants, bands, adhesive layers or other materials.

As is also discussed above, the navigation beacon 450 may take any shape and have dimensions of any size. For example, the navigation beacon 450 may be round, such as is shown in FIG. 4, and sufficiently small. In some other embodiments, the diameter $d_{450}$ may be approximately one to two inches (1-2 in.), and the thickness $t_{450}$ may be approximately one-quarter inch (0.25 in.), or about two to four millimeters (2 mm to 4 mm).

In some other embodiments, the navigation beacons may take any other shape, e.g., substantially square, rectangular, trapezoidal, pyramidal, or of any other shape, with straight corners and/or rounded sides or edges, and with any thickness. For example, the navigation beacon 450 may define a substantially rectangular or square cross section having dimensions of one inch by two inches (1"×2"), one inch by one inch (1"×1"). Such beacons may have edges of any length, with faces of any shapes, size or surface area, and may occupy any volume. Dimensions, shapes, thicknesses and/or volumes of such beacons may be selected on any basis or criterion, including but not limited to the dimensions, shapes, thicknesses and/or volumes of one or more internal components to be housed therein. In some embodiments, a navigation beacon may include one or more holes, bores or other openings, or other structural features, which may aid in binding the navigation beacon to a substantially immovable fixture, e.g., by one or more bolts, screws, rivets, nails or other like fasteners. In some other embodiments, navigation beacons may be joined to such structures or fixtures using belts, straps, bands, clamps, clips or any other tension or compression members. In other embodiments, navigation beacons may be mounted to ground features, e.g., by stakes, nails, posts or other components.

Figure 5B:
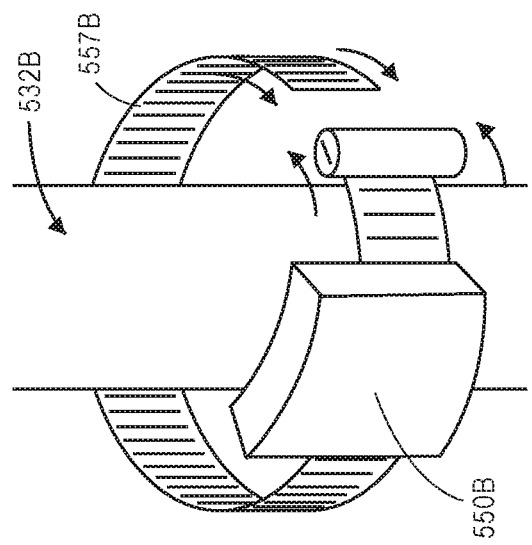
FIGS. 5A, 5B and 5C are views of navigation beacons in accordance with embodiments of the present disclosure.
Figure 5C:
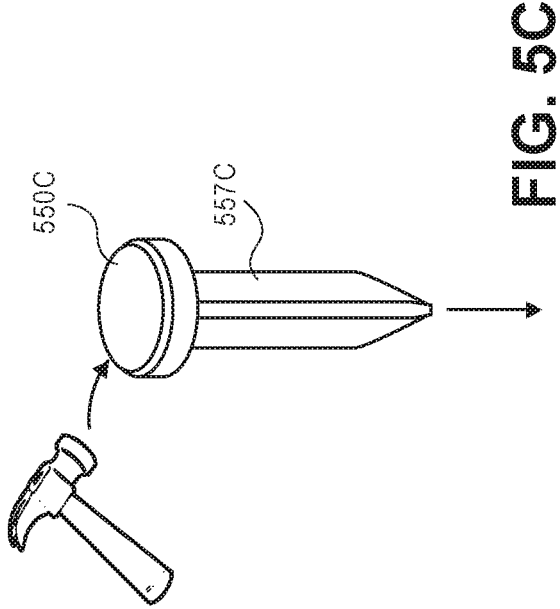
Figure 5A:
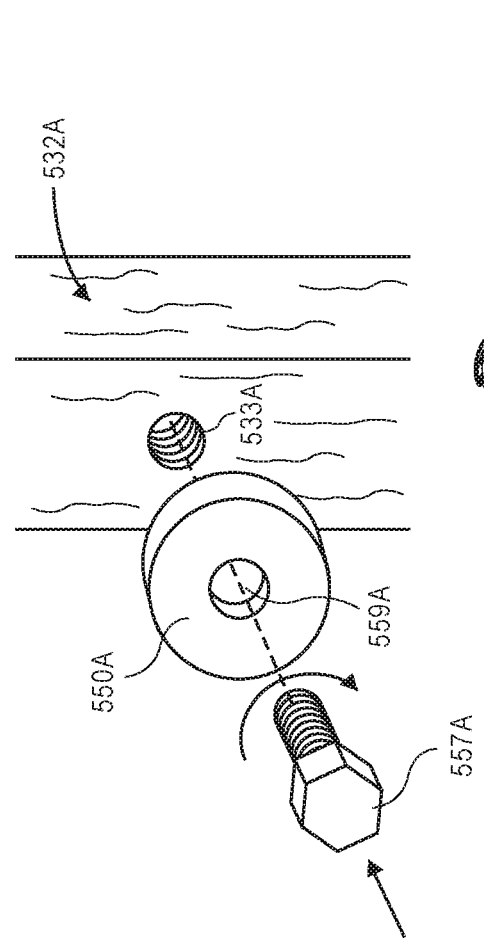

Referring to FIGS. 5A through 5C, views of navigation beacons 550A, 550B, 550C in accordance with embodiments of the present disclosure are shown. Except where otherwise noted, reference numerals preceded by the number "5" shown in FIGS. 5A through 5C indicate components or features that are similar to components or features having reference numerals preceded by the number "4" shown in FIG. 4, by the number "2" shown in FIG. 2 or by the number "1" shown in FIGS. 1A through 1D.

As is shown in FIGS. 5A through 5C, navigation beacons may be mounted, joined or otherwise installed to one or more structures or features having substantially fixed positions in any manner. For example, as is shown in FIG. 5A, the navigation beacon 550A has a substantially annular or toroidal construction, with a bore 559A extending therethrough. The navigation beacon 550A may be mounted to a post 532A, quickly and efficiently, by a fastener of any type or kind that may be accommodated within the bore 559A and fixedly or releasably joined to the post 532A. For example, as is shown in FIG. 5A, a threaded bolt 557A having a nominal and/or major diameter less than an internal diameter of the bore 559A may be extended through the bore 559A and rotated into an opening 533A having internal threads corresponding to the external threads of the threaded bolt 557A within the post 532A. Once the navigation beacon 550A is mounted to the post 532A, the navigation beacon 550A may receive position signals from one or more sources, e.g., while operating in a learning mode, and may determine its position based at least in part on such signals before reporting position information to one or more remote devices.

As is shown in FIG. 5B, the navigation beacon 550B is joined to a clamp 557B (e.g., a hose clamp or like banded fastener) that may be wrapped around a post 532B and securely bound in place, e.g., in tension. The navigation beacon 550B has a substantially rectangular cross-section and arcuate surfaces that may be selected at least in part on an arcuate surface associated with the post 532B, or on any other basis. The clamp 557B may be formed from any type or form of metal (e.g., stainless steel) having evenly spaced and equally sized perforations that may be used to guide and secure the clamp 557B around the post 532B. Alternatively, the clamp 557B may be formed from plastics, rubbers or any other sufficiently strong and durable tension members.

As is shown in FIG. 5C, the navigation beacon 550C is embedded within or otherwise associated with a stake 557C that may be driven into any sufficiently soft materials such as grasses or sods, dirt, or other natural or artificial surfaces, e.g., by a mallet, a hammer or another mechanical driver. The navigation beacon 550C of FIG. 5C is particularly useful where location services are desired in natural locations lacking any existing infrastructure, e.g., one or more of the posts 532A, 532B, or where installation is desired with minimal or limited cost or effort. The navigation beacon 550C may include a frame having a cavity housing one or more processors, memory components, transceivers and/or power sources that is embedded or otherwise provided in an upper layer of the stake 557C, or beneath one or more protective layers. Alternatively, the stake 557C may form the cavity housing the one or more components therein, which may be molded in a single-piece or multi-piece construction, or in any other manner. Those of ordinary skill in the pertinent arts will recognize that the navigation beacons of the present disclosure may be mounted and/or installed in any manner and by any means, including but not limited to one or more belts, straps, bands, clamps, clips, glues, straps, tapes, fasteners, stakes, nails or posts, any other tension members, compression members or adhesives or the like.

Figure 6:
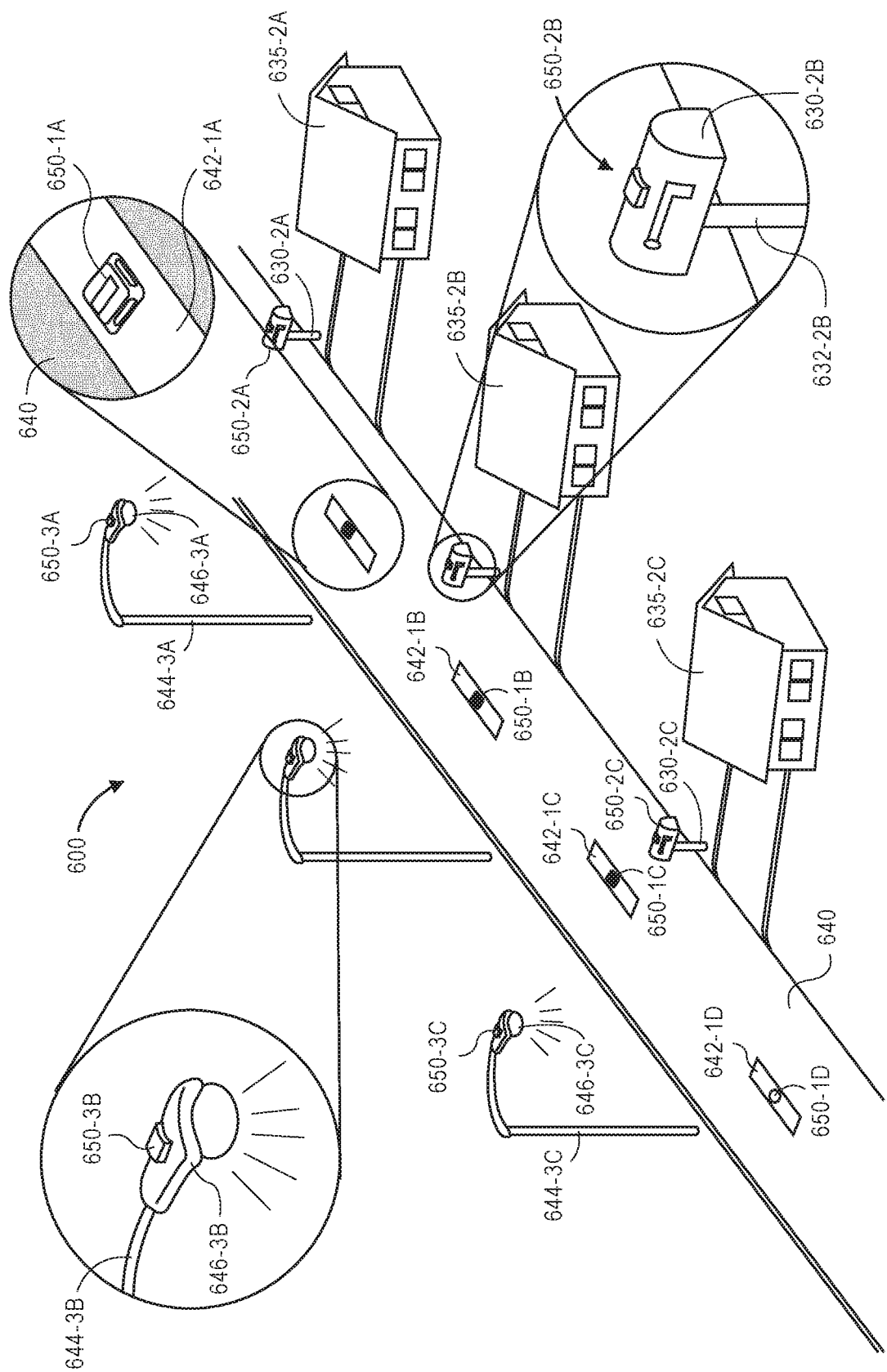
FIG. 6 is a view of a system having a plurality of navigation beacons in accordance with embodiments of the present disclosure.

As is also discussed above, the navigation beacons of the present disclosure may be mounted to or otherwise installed on existing physical infrastructure, e.g., the traffic sign 130 of FIGS. 1A through 1D. In particular, the navigation beacons of the present disclosure may be effectively utilized when installed on structures or features that are fixed in position and not likely subject to tampering, intentional or unintentional disturbances, or adverse effects of the elements. Some such structures or features may include existing transportation infrastructure such as street signs, street lights, or streets themselves, as well as one or more aspects of structures, buildings or facilities. Referring to FIG. 6, a view of one system 600 having a plurality of navigation beacons in accordance with embodiments of the present disclosure is shown. Except where otherwise noted, reference numerals preceded by the number "6" shown in FIG. 6 indicate components or features that are similar to components or features having reference numerals preceded by the number "5" shown in FIGS. 5A through 5C, by the number "4" shown in FIG. 4, by the number "2" shown in FIG. 2 or by the number "1" shown in FIGS. 1A through 1D.

As is shown in FIG. 6, the system 600 includes a plurality of navigation beacons 650-1A, 650-1B, 650-1C, 650-1D, 650-2A, 650-2B, 650-2C, 650-3A, 650-3B, 650-3C that are mounted to or otherwise installed on structural features that are commonly associated with transportation and/or habitation. For example, the system 600 includes a street 640 or other pavement marking that is lined with a plurality of stripes 642-1A, 642-1B, 642-1C, 642-1D that bisect the street 640 into lanes of travel in the same or opposite directions. The stripes 642-1A, 642-1B, 642-1C, 642-1D may be formed from paint, resins (e.g., including pigments and/or reflective beads) or one or more other substrates or layers applied to a top course of the street 640. Moreover, each of the stripes 642-1A, 642-1B, 642-1C, 642-1D includes one of the navigation beacons 650-1A, 650-1B, 650-1C, 650-1D installed therein, e.g., in a manner similar to that of one or more raised pavement safety markers or devices.

Installing the navigation beacons 650-1A, 650-1B, 650-1C, 650-1D within or in association with the stripes 642-1A, 642-1B, 642-1C, 642-1D of the street 640 may be accomplished quickly and effectively, with limited labor, materials or time required, and may be particularly advantageous in that the navigation beacons 650-1A, 650-1B, 650-1C, 650-1D may be reasonably relied upon to remain in place, in a constant location and an undisturbed state. Similarly, navigation beacons may be installed within any other aspect of a street, an avenue, a boulevard, a highway, a sidewalk, a path or another ground-based infrastructure feature, e.g., the street 640, in any other manner. For example, navigation beacons may be installed within one or more cat's eyes, Botts' dots, access aprons, rumble strips or other mechanical markings within the street 640, or within any other infrastructure feature.

The street 640 further includes a plurality of mail receptacles (e.g., mail boxes) 630-2A, 630-2B, 630-2C, each of which is mounted to a post 632-2A, 632-2B, 632-2C that is rigidly installed in front of one of the dwellings 635-2A, 635-2B, 635-2C. As is shown in FIG. 6, the navigation beacons 650-2A, 650-2B, 650-2C are installed atop the mail receptacles 630-2A, 630-2B, 630-2C. Installing the navigation beacons 650-2A, 650-2B, 650-2C within or in association with the mail receptacles 630-2A, 630-2B, 630-2C may be accomplished quickly and effectively, with limited labor, materials or time required, e.g., with no more labor than that exerted by a mail carrier on a daily basis, and without having to stop traffic or establish safety zones, such as may be required to install the navigation beacons 650-1A, 650-1B, 650-1C, 650-1D in the stripes 642-1A, 642-1B, 642-1C, 642-1D of the street 640. Moreover, the navigation beacons 650-2A, 650-2B, 650-2C may be reasonably relied upon to remain in place, in a constant location and an undisturbed state defined by the posts 632-2A, 632-2B, 632-2C, particularly because the unauthorized tampering with the mail receptacles 630-2A, 630-2B, 630-2C is likely prohibited by federal law.

The street 640 also includes a plurality of street lamps 644-3A, 644-3B, 644-3C, each of which includes a light fixture 646-3A, 646-3B, 646-3C that extends above and over the street 640, e.g., at heights of fifteen to twenty feet or more above the street 640, and is configured to project artificial light downward onto the street 640, as may be desired or required in view of visibility and/or weather conditions. As is shown in FIG. 6, the navigation beacons 650-3A, 650-3B, 650-3C are installed atop the light fixtures 646-3A, 646-3B, 646-3C. Installing the navigation beacons 650-3A, 650-3B, 650-3C atop the light fixtures 646-3A, 646-3B, 646-3C may be particularly advantageous in that the tampering with or disturbing the navigation beacons 650-3A, 650-3B, 650-3C will be inherently difficult due to their elevated locations above the street 640, which greatly increase the likelihood that the transmission or receipt of signals by navigation beacons 650-3A, 650-3B, 650-3C may occur in an unimpeded manner by or between sources or remote devices positioned above the street lamps 644-3A, 644-3B, 644-3C, e.g., aerial vehicles in flight.

Figure 7A:
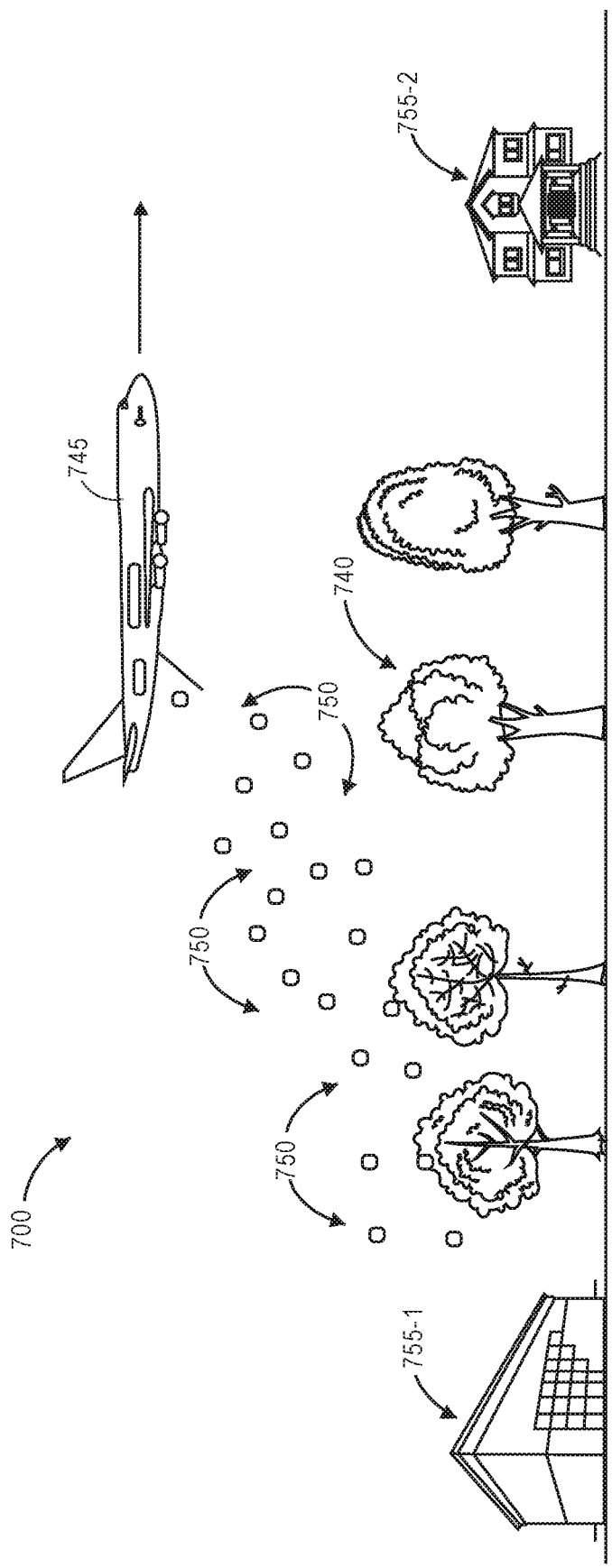
FIGS. 7A and 7B are views of aspects of one system having a plurality of navigation beacons in accordance with embodiments of the present disclosure.
Figure 7B:
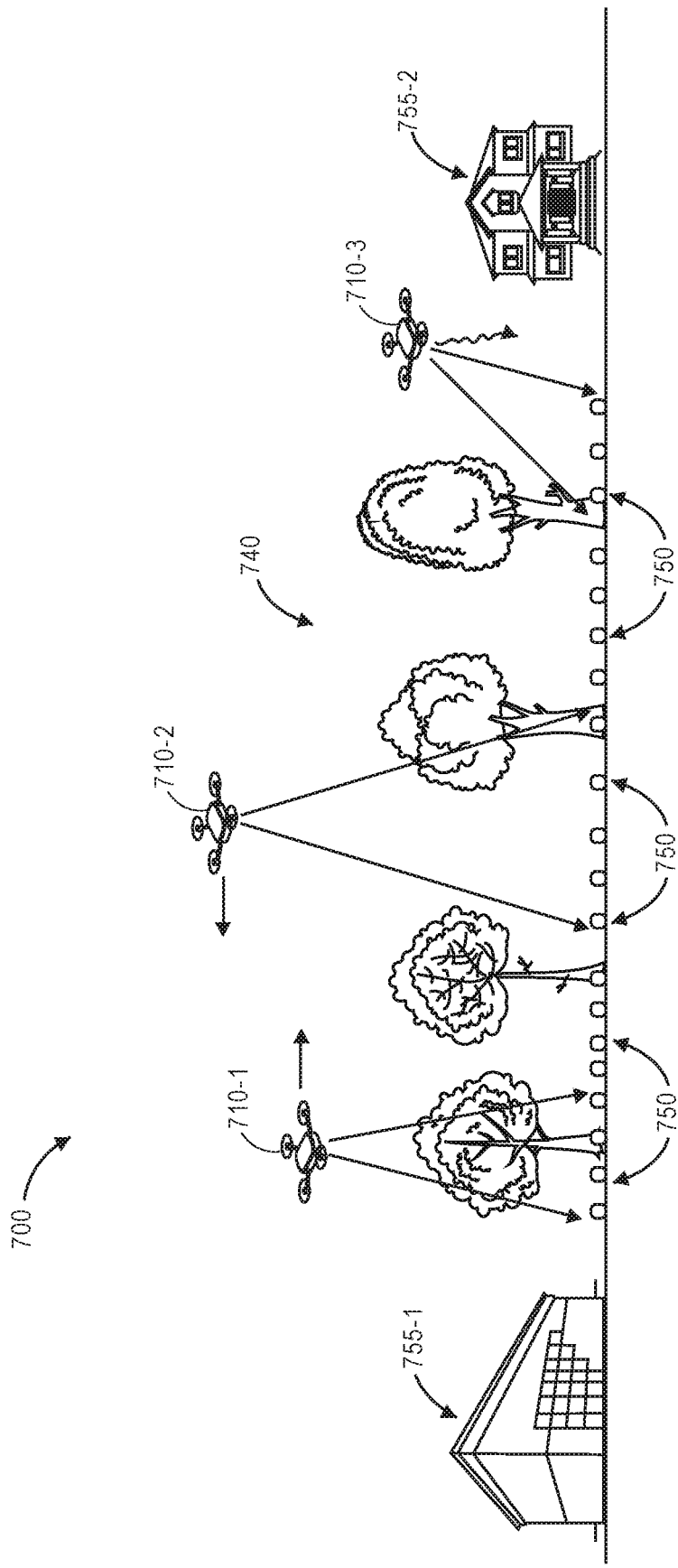

The navigation beacons of the present disclosure may be deployed and/or installed in any manner, e.g., manually, by one or more workers, or automatically, by one or more machines. In some embodiments, the navigation beacons may be deployed in bulk, in multiple locations, and may begin to learn their respective positions immediately or shortly following their deployment. Referring to FIGS. 7A and 7B, views of aspects of one system 700 having a plurality of navigation beacons in accordance with embodiments of the present disclosure is shown. Except where otherwise noted, reference numerals preceded by the number "7" shown in FIGS. 7A and 7B indicate components or features that are similar to components or features having reference numerals preceded by the number "6" shown in FIG. 6, by the number "5" shown in FIGS. 5A through 5C, by the number "4" shown in FIG. 4, by the number "2" shown in FIG. 2 or by the number "1" shown in FIGS. 1A through 1D.

As is shown in FIG. 7A, the system 700 includes a clearing (or other open space) 740, a fulfillment center (or warehouse, or like distribution facility) 755-1 and a dwelling 755-2. As is also shown in FIG. 7A, a carrier vehicle 745 (e.g., a cargo aircraft) traveling over the clearing 740 deploys a plurality of navigation beacons 750 according to one or more of the embodiments of the present disclosure. For example, each of the navigation beacons 750 may include one or more processors, memory components, transceivers and/or power sources to enable such beacons 750 to operate autonomously within the clearing 740, immediately upon landing or shortly thereafter. The navigation beacons 750 may have suitable sizes or shapes that enable the navigation beacons 750 to be safely stored aboard the carrier vehicle 745 and dispensed therefrom, and to survive an impact with ground or other surface features within the clearing 740. In some embodiments, the navigation beacons 750 may be equipped with a retractable parachute or other system enabling the navigation beacons 750 to disembark from the carrier vehicle 745 and land safely within the clearing 740. The carrier vehicle 745 may include one or more air-to-ground delivery systems for deploying the navigation beacons 750 therefrom, in any manner, including but not limited to a free-drop, a high-velocity airdrop, a low-velocity airdrop, or a low-altitude extraction. Alternatively, the navigation beacons 750 may be delivered to the clearing 740 using any other type or form of aerial vehicle, including but not limited to aircraft that are powered by jets, propellers or wind, such as unmanned aerial vehicles (or drones), helicopters, gliders or the like. As yet another alternative, the navigation beacons 750 may be dispensed within the clearing 740 or any other area by a ground-based vehicle, e.g., one or more cars, trucks, vans and/or trailers.

In some embodiments, the locations where navigation beacons are deployed in bulk, such as the clearing 740, may be selected on any basis, including but not limited to ground or air traffic that may be expected on or above such locations. For example, referring again to FIG. 7A, where traffic between two or more points of interest, e.g., between the fulfillment center 755-1 and the dwelling 755-2, is common, deploying navigation beacons of the present disclosure to an area between such points of interest, such as the clearing 740 between the fulfillment center 755-1 and the dwelling 755-2, may result in the establishment of a navigation system that may act as a primary and/or a secondary (e.g., backup) source of position information for subsequent travel by one or more vehicles or other remote devices between the points of interest, e.g., after the navigation beacons 750 have been trained to recognize their own respective positions based on signals received from one or more sources.

As is shown in FIG. 7B, where a plurality of aerial vehicles 710-1, 710-2, 710-3 operate along one or more routes between the fulfillment center 755-1 and the dwelling 755-2 that pass over and/or near the clearing 740, the aerial vehicle 710-1, 710-2, 710-3 may transmit one or more signals to the navigation beacons 750, and receive one or more signals from the navigation beacons 750. Where a navigation beacon 750 operates in a learning mode, signals received from the aerial vehicles 710-1, 710-2, 710-3 that include position information may be used to train the navigation beacon 750 as to its position. After the navigation beacon 750 has transitioned to a service mode, however, the navigation beacon 750 may transmit signals including position information to the one or more aerial vehicles 710-1, 710-2, 710-3, or any other remote device that requests position information from the navigation beacon 750. Moreover, as is discussed above, after one of the navigation beacons 750 has determined its position to a sufficiently high degree of confidence, that one of the navigation beacons 750 may be utilized to train one or more of the other navigation beacons 750 to learn their respective positions.

Figure 8A:
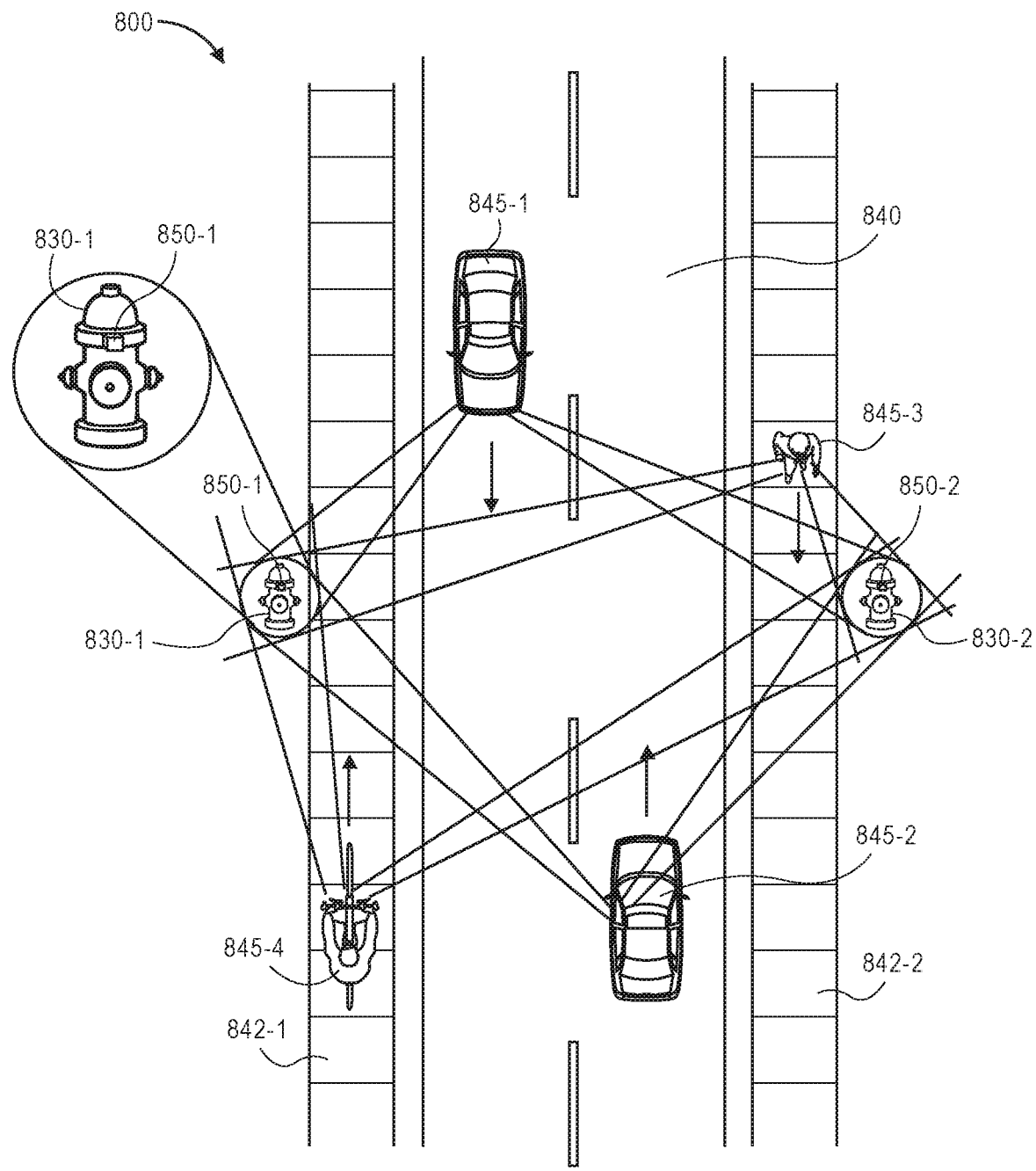
FIGS. 8A and 8B are views of aspects of one system having a plurality of navigation beacons in accordance with embodiments of the present disclosure.
Figure 8B:
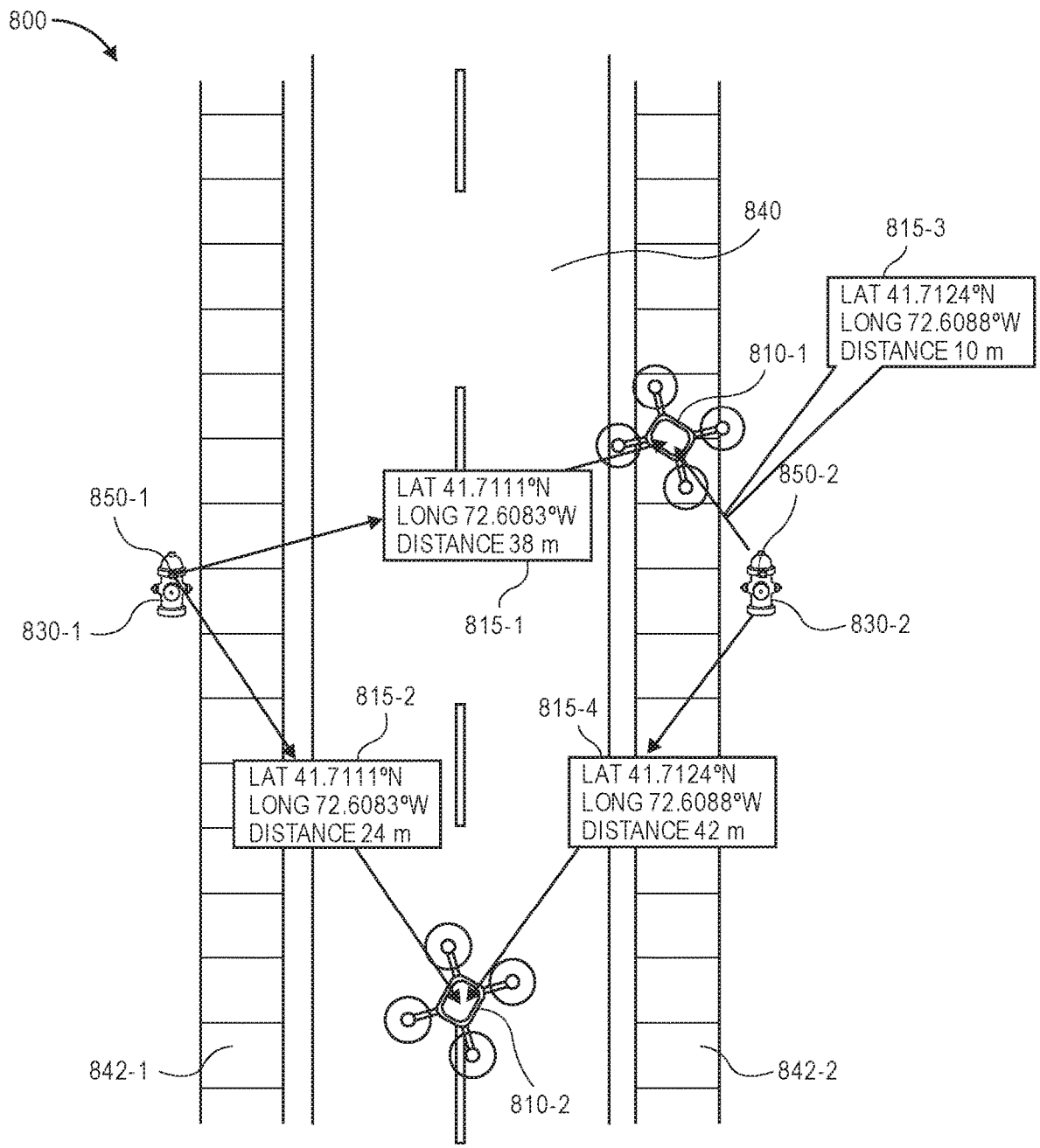

The navigation beacons of the present disclosure may learn their respective positions, or be trained, based on signals that are received from any number or type of sources, and are not limited for use in connection with aerial vehicles. Moreover, signals received by a remote device from any number of such beacons may be used to determine a position of the remote device. Referring to FIGS. 8A and 8B, views of aspects of one system 800 having a plurality of navigation beacons in accordance with embodiments of the present disclosure is shown. Except where otherwise noted, reference numerals preceded by the number "8" shown in FIGS. 8A and 8B indicate components or features that are similar to components or features having reference numerals preceded by the number "7" shown in FIGS. 7A and 7B, by the number "6" shown in FIG. 6, by the number "5" shown in FIGS. 5A through 5C, by the number "4" shown in FIG. 4, by the number "2" shown in FIG. 2 or by the number "1" shown in FIGS. 1A through 1D.

As is shown in FIG. 8A, the system 800 includes a pair of fire hydrants 830-1, 830-2 (or other features of public or private infrastructures, or other structures) adjacent to a street 840. Each of the fire hydrants 830-1, 830-2 has a navigation beacon 850-1, 850-2 fixed thereto. The street 840 is lined by a pair of sidewalks 842-1, 842-2. Additionally, a pair of automobiles 845-1, 845-2 travel on the street 840 in opposite directions, while a pedestrian 845-3 walks on the sidewalk 842-2 and a cyclist 845-4 rides on the sidewalk 842-1.

In accordance with the present disclosure, any type of signal source and/or remote device may be configured to transmit position signals that may be captured and interpreted by the navigation beacons 850-1, 850-2. For example, the automobiles 845-1, 845-2 may be equipped with one or more onboard remote devices, e.g., computer devices associated with a navigation console or like system, that may be configured to transmit position signals including their respective positions and, alternatively, their respective courses, speeds, elevations or other attributes. The navigation beacons 850-1, 850-2 may be configured to interpret the signals and recognize the position data included therein, while also determining bearings and/or distances from which such signals originated. Similarly, the pedestrian 845-3 and/or the cyclist 845-4 may be equipped with one or more mobile devices (not shown) having components or executing applications that are specifically configured to transmit position signals to the navigation beacons 850-1, 850-2, which may similarly interpret such signals, and determine their respective bearings and/or distances from which such signals originated. Based at least in part on such signals, the navigation beacons 850-1, 850-2 may be trained to recognize their respective positions. The time required for the navigation beacons 850-1, 850-2 to learn their positions may vary based at least in part on the level of traffic on the street 840 and/or the sidewalks 842-1, 842-2, and any other operational or environmental factors, including but not limited to the number of sources (e.g., the automobiles 845-1, 845-2, the pedestrian 845-3 and/or the cyclist 845-4, as well as any other sources) from which signals are received, or any other factor.

Once the navigation beacons 850-1, 850-2 have been trained to recognize their respective positions, the navigation beacons 850-1, 850-2 may be configured to transmit information regarding its position to one or more remote devices, which may be ground-based and/or airborne, or to transmit information regarding positions of such devices. As is shown in FIG. 8B, aerial vehicles 810-1, 810-2 passing over the street 840 and the sidewalks 842-1, 842-2. The aerial vehicles 810-1, 810-2 may actively poll the navigation beacons 850-1, 850-2 for position signals indicative of a latitude and longitude of the navigation beacons 850-1, 850-2, or of their respective latitudes and/or longitudes, from which their respective latitudes and/or longitudes may be determined. For example, as is shown in FIG. 8B, the navigation beacon 850-1 may transmit position signals 815-1, 815-2 to the aerial vehicles 810-1, 810-2. Such position signals 815-1, 815-2 may include a position of the navigation beacon 850-1 (viz., 41.7111° N, 72.6083° W) and distances from the navigation beacon 850-1 to each of the aerial vehicles 810-1, 810-2 (viz., thirty-eight meters and twenty-four meters), respectively. Likewise, the navigation beacon 850-2 may transmit position signals 815-3, 815-4 to the aerial vehicles 810-1, 810-2. Such position signals 815-3, 815-4 may include a position of the navigation beacon 850-2 (viz., 41.7124° N, 72.6088° W) and distances from the navigation beacon 850-2 to each of the aerial vehicles 810-1, 810-2 (viz., ten meters and forty-two meters), respectively. Each of the aerial vehicles 810-1, 810-2 may pinpoint their respective positions based on intersections of circumferences (e.g., circles) extending from points corresponding to the positions of the navigation beacons 850-1, 850-2 included in the position signals 815-1, 815-2, 815-3, 815-4 by radii defined by the distances included in the position signals 815-1, 815-2, 815-3, 815-4. Alternatively, the navigation beacons 850-1, 850-2 may push position signals (e.g., signals identifying its own latitude and longitude) to any other remote devices that may be equipped to capture and interpret such signals in any manner to determine the respective positions of such other remote devices.

Figure 9:
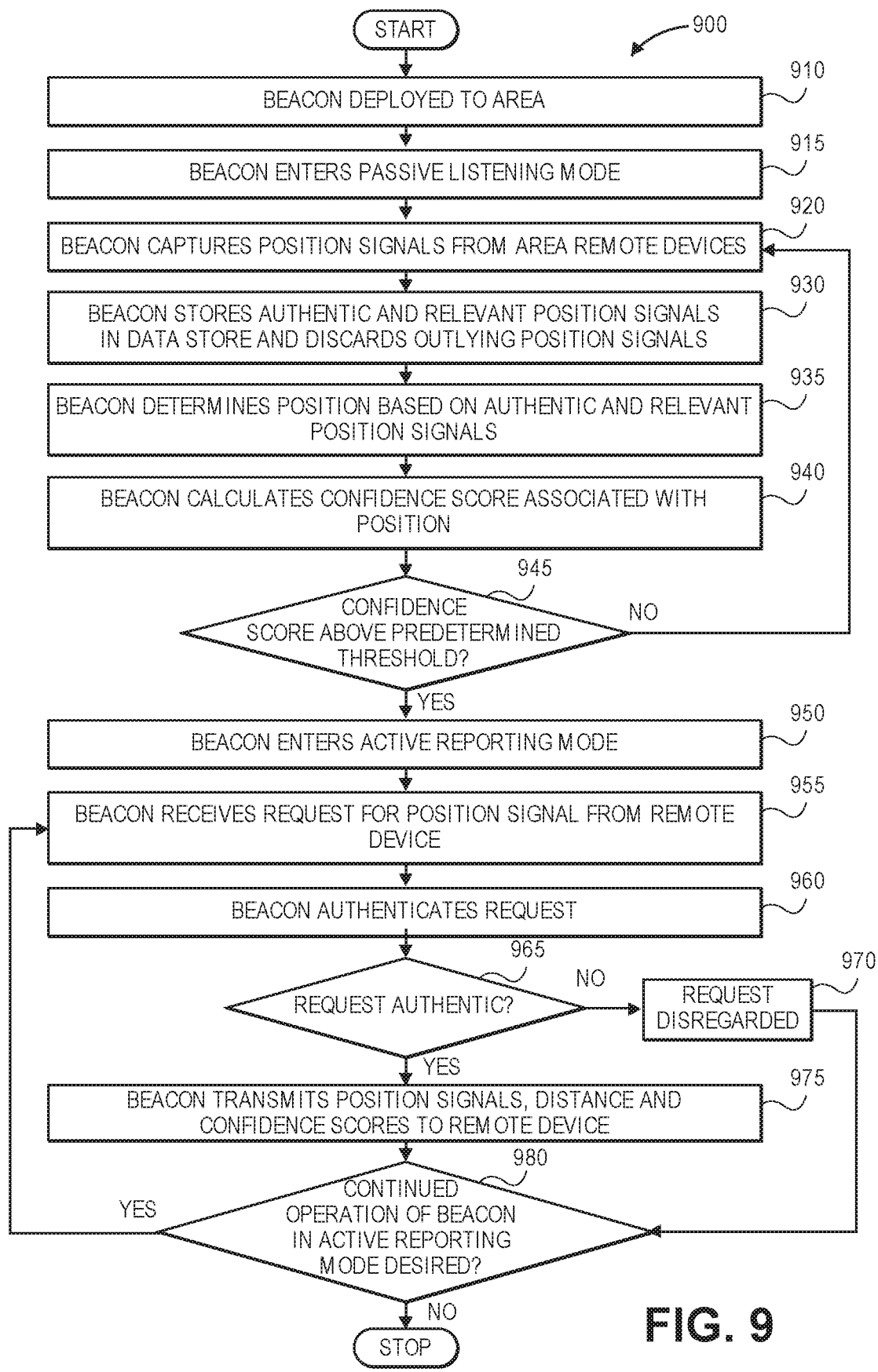
FIG. 9 is a flow chart of one process for navigating using one or more navigation beacons in accordance with embodiments of the present disclosure.

As is also discussed above, a navigation system that relies on one or more navigation beacons of the present disclosure may operate in a number of modes, and each of such beacons may learn its position by filtering irrelevant or unreliable position signals from a set of relevant or reliable position signals. Referring to FIG. 9, a flow chart 900 of one process for navigating using one or more navigation beacons in accordance with embodiments of the present disclosure is shown. At box 910, a beacon is deployed to an area, e.g., either singly or in bulk, in a substantially constant position. At box 915, the beacon enters a passive listening mode, and at box 920, the beacon captures position signals from one or more remote devices within the area. In the listening mode, the beacon effectively monitors for position signals transmitted by one or more sources, including not only passive or stationary objects or structures such as one or more antennas, towers or other transmitters associated with one or more AM/FM radio stations, television stations, cellular telephone systems or WiFi systems but also mobile objects such as one or more aerial vehicles, ground-based vehicles, mobile devices (e.g., specifically configured mobile devices or mobile devices operating one or more location-based applications) or the like. Alternatively, the beacon may actively solicit one or more position signals, e.g., by polling or requesting such signals. In some implementations, the beacon may authenticate the signals on any basis or by any means, including but not limited to determining whether the position signals include an authentication key, or by cryptographically decoding the signals. The beacon may also identify a source of a position signal, and determine whether the position signal is authentic, or requires further scrutiny, based on its source. Alternatively, however, the beacon need not authenticate the position signals, and may simply accept position signals from any source without any authentication or validation thereof. At box 930, the beacon stores position signals that have been deemed both authentic and relevant in a data store associated with the beacon, e.g., an SRAM, an SDRAM, a Flash memory, or any other type of fixed or removable memory component, and discards any outlying position signals. For example, a position signal may be authenticated based on its content, and authentic position signals may be evaluated to determine whether such signals are sufficiently accurate and precise, e.g., based on one or more intrinsic attributes of the beacon and/or the remote devices, one or more extrinsic attributes of the area (e.g., environmental factors or any other considerations), or on any other factor. Authentic and relevant position signals may be stored, and outliers (e.g., inauthentic or irrelevant position signals) may be disregarded.

At box 935, the beacon determines its position based at least in part on the authentic and relevant position signals, and at box 940, the beacon calculates a confidence score associated with its position. The confidence score may be calculated in any manner and according to any technique, e.g., a Gaussian distribution. Alternatively, the confidence may be defined as a percent of reliability, or as a number or set of coordinates, a distance, or any other measure of reliability associated with the position. At box 945, whether the confidence score is above a predetermined threshold is determined. For example, if the confidence score is not above the predetermined threshold, and is thus deemed insufficiently reliable, then the process will return to box 920, where the beacon captures one or more other position signals, e.g., from one or more other remote devices. If the confidence score exceeds the predetermined threshold, then the process advances to box 950, where the beacon enters an active reporting mode.

At box 955, the beacon receives a request for a position signal from a remote device, and at box 960, the beacon authenticates the request. The request may be authenticated by a beacon according to the same authentication methods or techniques by which the position signals are authenticated at box 930, or by one or more different authentication methods or techniques. The beacon may also identify the remote device (or an operator or organization associated with the remote device) that placed the request, and determine whether the request is authentic, or requires further scrutiny, based on the identity of the remote device. Alternatively, however, the beacon need not authenticate the request, and may simply accept and respond to requests from any remote device without any authentication or validation thereof. At box 965, if the request is not determined to be authentic, then the process advances to box 970, where the request is disregarded. If the request is determined to be authentic, however, then the process advances to box 975, where the beacon transmits a position signal (e.g., including coordinates or other information regarding a position of the beacon), a distance to the remote device, and confidence scores associated with the position signal and the distance to the remote device from which the request was received at box 955. The position signal may also include any other information regarding the beacon and/or the remote device, including a bearing from the beacon to the remote device, or another measure of confidence in the position, the bearing or the distance, or any other relevant information or data.

At box 980, after the position signal has been transmitted in response to an authentic request at box 975, or after an inauthentic request is discarded at box 970, whether the continued operation of the beacon in an active reporting mode is desired is determined. If the continued operation of the beacon is no longer desired, then the process ends. If the continued operation of the beacon is desired, however, then the process returns to box 955, where the beacon receives another request for a position signal from one or more other remote devices.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the embodiments disclosed herein reference the use of signals transmitted by one or more aerial vehicles to train a navigational beacon as to its position, or the use of signals transmitted by a navigational beacon for navigation of an aerial vehicle, those of ordinary skill in the pertinent arts will recognize that the systems and methods disclosed herein are not so limited, and may be utilized in connection with any type or form of vehicle (e.g., manned or unmanned), or for any type of function for which position information is desired. Moreover, signals of any kind (e.g., position signals, requests for position signals, or authentication signals) may be transmitted to a navigation beacon by any type of source or remote device, and received from a navigation beacon by any type of source or remote device.

Furthermore, although some of the embodiments disclosed herein reference the use of positions obtained from satellites of the GPS system to train a navigation beacon, e.g., based on signals transmitted to the navigation beacon, those of ordinary skill in the pertinent arts will recognize that the systems and methods disclosed herein are not so limited. Position information included in one or more of signals transmitted to a navigation beacon may be obtained from any source, including but not limited to the GPS system and also any other navigation or positioning system, including but not limited to one or more other global navigation satellite systems. Moreover, the systems and methods by which navigation beacons are mounted or installed in their respective locations or to one or more structures are not limited to any of the embodiments disclosed herein.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3 or 9, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A method comprising:
   depositing a beacon in a location, wherein the beacon comprises:
   a processor;
   a transceiver; and
   a power source;
   receiving, by the transceiver of the beacon, at least a first signal from a first vehicle, wherein the first signal comprises:
   a latitude of the first vehicle at a first time;
   a longitude of the first vehicle at the first time; and
   an altitude of the first vehicle at the first time,
   wherein the beacon is not programmed with a position of the beacon prior to receiving the first signal;
   determining, by the processor of the beacon, the position of the beacon based in part on the first signal;
   receiving, by the transceiver of the beacon, at least a second signal from a second vehicle,
   wherein the second signal comprises a request for a position of the second vehicle; and
   in response to the request,
   determining, by the processor of the beacon, the position of the second vehicle based at least in part on the position of the beacon and the first signal; and
   transmitting, by the transceiver of the beacon, a third signal comprising information regarding the position of the second vehicle to the second vehicle.

2. The method of claim 1, wherein the depositing the beacon in the location comprises one of:
   dropping the beacon by air at the location; or
   fastening the beacon to a structure at the location.

3. A method comprising:
   prior to a first time,
   depositing a first beacon at a location;
   receiving at least a first signal by a first beacon, wherein the first signal is transmitted by a first system, and wherein the first signal comprises information regarding a position of the first system associated with the location at the first time;
   determining, by the first beacon, a position of the first beacon based at least in part on the information regarding the position of the first system at the first time; and
   transmitting, by the first beacon to a second system at a second time, a second signal comprising information regarding the position of the first beacon and information regarding a distance between the position of the first beacon and a position of the second system at the first time,
   wherein the second time follows the first time, and
   wherein the first beacon comprises a circuit board having at least one processor, at least one memory component, at least one transceiver and at least a portion of at least one power source.

4. The method of claim 3, wherein the first beacon is mounted to one of:
   a structure comprising a lighting element at the location;
   a structure comprising a mail receptacle at the location; or
   a structure embedded in a roadway surface at the location.

5. The method of claim 3, wherein receiving at least the first signal by the first beacon comprises:
   receiving a plurality of signals by the first beacon, wherein each of the plurality of signals comprises information regarding a position of one of a plurality of systems at a time, and wherein the first signal is one of the plurality of signals, and wherein the first system is one of the plurality of systems.

6. The method of claim 3, further comprising:
   determining, by the first beacon, that the first signal further comprises a predetermined authentication key,
   wherein the position of the first beacon is determined based at least in part on the information regarding the position of the first beacon in response to determining that the first signal further comprises the predetermined authentication key.

7. The method of claim 3, further comprising:
   determining, by the first beacon, a confidence level associated with at least one of the position of the first beacon or the distance between the position of the first beacon and the position of the second system at the first time,
   wherein the second signal further comprises the confidence level.

8. The method of claim 3, further comprising:
   determining, by the first beacon, a confidence level associated with at least one of the position of the first beacon or the distance between the position of the first beacon and the position of the first system at the first time; and
   determining, by the first beacon, that the confidence level exceeds a predetermined threshold,
   wherein the second signal is transmitted in response to determining that the confidence level exceeds a predetermined threshold.

9. The method of claim 3, further comprising:
   receiving at least a third signal by the first beacon at a third time, wherein the third signal is transmitted by the second system, wherein the third signal comprises a request for information regarding the position of the first beacon, and wherein the third time precedes the second time; and
   authenticating, by the first beacon, the third signal,
   wherein the second signal is transmitted by the first beacon to the second system at the second time in response to authenticating the third signal.

10. The method of claim 3, wherein the first beacon comprises a frame formed from at least one of a plastic, a metal, a wood or a composite material, and
    wherein the circuit board is disposed within the frame.

11. The method of claim 3, wherein receiving at least the first signal by the first beacon comprises:
    receiving a third signal by the first beacon, wherein the third signal is transmitted by one of a second beacon or a third system, wherein the third signal comprises information regarding a position of the one of the second beacon or the third system at a third time, and wherein the third time precedes the second time,
    wherein the position of the first beacon is determined based at least in part on the information regarding the position of the first system at the first time and the information regarding the one of the second beacon or the third system at the third time.

12. The method of claim 3, wherein determining the position of the first beacon comprises:
determining, by the first beacon based at least in part on the information regarding the position of the first system at the first time, a first latitude and a first longitude of the first system at the first time;
determining, by the first beacon based at least in part on the information regarding the position of the first system at the first time, a first bearing from which the first signal was received; and
determining, by the first beacon, the position of the first beacon based at least in part on at least the first latitude, the first longitude and the first bearing.

13. The method of claim 3, wherein at least one of the first signal or the second signal is one of:
a signal in one of a plurality of two-megahertz channels within a spectrum of approximately 2.4000 to 2.4835 gigahertz (GHz);
a signal having a bandwidth of at least five hundred megahertz transmitted within a spectrum of approximately 3.1 to 10.6 gigahertz (GHz); or
a signal within a spectrum of approximately 902 to 928 megahertz (MHz).

14. The method of claim 3, wherein the at least one power source comprises at least one of a battery, a fuel cell or a solar cell.

15. The method of claim 3, further comprising:
receiving, by the first beacon, at least a third signal, wherein the third signal is transmitted by a third system, wherein the third signal comprises information regarding a position of the third system at a third time, and wherein the third time follows the second time; and
updating, by the first beacon, the position of the first beacon based at least in part on the information regarding the position of the third system at the third time.

16. A first beacon comprising:
a frame;
at least one processor disposed within the frame;
at least one power source disposed within the frame; and
at least one transceiver disposed within the frame,
wherein the at least one processor is configured to at least:
identify at least a first signal received from a first system by the at least one transceiver, wherein the first signal comprises information regarding a position of the first system at a first time, and wherein the information regarding the position of the first system at the first time comprises:
a latitude of the first system at the first time;
a longitude of the first system at the first time; and
an altitude of the first system at the first time,
wherein the first beacon is not programmed with a position of the first beacon prior to the first time;
determine a first bearing from which the first signal was received;
determine the position of the first beacon based at least in part on the information regarding the position of the first system at the first time and the first bearing; and
cause the at least one transceiver to transmit a second signal comprising information regarding the position of the first beacon to a second system at a second time, wherein the information regarding the position of the first beacon comprises:
a latitude of the first beacon; and
a longitude of the first beacon.

17. The first beacon of claim 16, wherein one of the first system or the second system is:
a vehicle; or
a second beacon comprising a frame, at least one processor disposed within the frame, at least one power source disposed within the frame, and at least one transceiver disposed within the frame.

18. The first beacon of claim 16, wherein the at least one processor is further configured to at least:
identify at least a third signal received from a third system by the at least one transceiver, wherein the third signal comprises information regarding a position of the third system at a third time, wherein the third time precedes the second time, and wherein the information regarding the position of the third system at the third time comprises:
a latitude of the third system at the third time;
a longitude of the third system at the third time; and
an altitude of the third system at the third time; and
determine a second bearing from which the second signal was received,
wherein the position of the first beacon is determined based at least in part on the information regarding the position of the first system at the first time, the first bearing, the information regarding the position of the third system at the third time, and the second bearing.

19. The first beacon of claim 18, wherein the information regarding the position of the first system at the first time comprises a level of accuracy of one or more of the first signal, the latitude of the first system at the first time, the longitude of the first system at the first time or the altitude of the first system at the first time,
wherein the information regarding the position of the third system at the third time comprises a level of accuracy of one or more of the third signal, the latitude of the third system at the third time, the longitude of the third system at the third time or the altitude of the third system at the third time,
wherein the at least one processor is further configured to at least:
define an area based at least in part on the information regarding the position of the first system at the first time and the information regarding the position of the third system at the first time, and
wherein the position of the first beacon is within the area.

20. The method of claim 1, wherein at least one of the first signal, the second signal or the third signal is one of:
a signal in one of a plurality of two-megahertz channels within a spectrum of approximately 2.4000 to 2.4835 gigahertz (GHz);
a signal having a bandwidth of at least five hundred megahertz transmitted within a spectrum of approximately 3.1 to 10.6 gigahertz (GHz); or
a signal within a spectrum of approximately 902 to 928 megahertz (MHz).

* * * * *